United States Patent
Matsuda

(10) Patent No.: US 10,542,099 B2
(45) Date of Patent: Jan. 21, 2020

(54) GATEWAY DEVICE AND DATA COLLECTION METHOD

(71) Applicant: FUJITSU LIMITED, Kawasaki-shi, Kanagawa (JP)

(72) Inventor: Kazuhito Matsuda, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 120 days.

(21) Appl. No.: 15/730,800

(22) Filed: Oct. 12, 2017

(65) Prior Publication Data

US 2018/0109630 A1    Apr. 19, 2018

(30) Foreign Application Priority Data

Oct. 17, 2016    (JP) .................................. 2016-203775

(51) Int. Cl.
*G06F 15/173*    (2006.01)
*H04L 29/08*    (2006.01)

(52) U.S. Cl.
CPC .......... *H04L 67/146* (2013.01); *H04L 67/142* (2013.01); *H04L 67/147* (2013.01); *H04L 67/327* (2013.01)

(58) Field of Classification Search
None
See application file for complete search history.

(56) References Cited

U.S. PATENT DOCUMENTS

| | | | |
|---|---|---|---|
| 2006/0168264 A1* | 7/2006 | Baba | H04L 12/2809 709/230 |
| 2006/0242285 A1 | 10/2006 | Moriwaki | |
| 2007/0162748 A1* | 7/2007 | Okayama | H04L 63/0428 713/165 |
| 2008/0168135 A1* | 7/2008 | Redlich | G06Q 10/10 709/204 |
| 2014/0298009 A1* | 10/2014 | Hattori | H04L 9/3073 713/155 |

FOREIGN PATENT DOCUMENTS

| | | | |
|---|---|---|---|
| JP | 2004127186 A | * | 4/2004 |
| JP | 2006-268431 | | 10/2006 |
| JP | 2006-350511 | | 12/2006 |

* cited by examiner

*Primary Examiner* — Phyllis A Book
(74) *Attorney, Agent, or Firm* — XSENSUS LLP

(57) ABSTRACT

A gateway device that accesses to an information processing device includes a memory and a processor coupled to the memory and configured to when the data corresponding to the search key information, transmit the search key information to a first gateway device; when the search key information from a second gateway device is received and the received search key information is not included in the search key information, transmit the search key information; when the data corresponding to the search key information is not included in the search key information that has been transmitted to the information processing device, transmit the search key information corresponding to plural pieces of data; and determine whether or not continue to transmit the search key information to first gateway device based on a first ratio and a second ratio when the gateway device transmits the search key information to the first gateway device.

9 Claims, 31 Drawing Sheets

FIG. 26A

| INFORMATION ID | APPARATUS INFORMATION | IDENTIFICATION INFORMATION | GATAWAY INFORMATION |
|---|---|---|---|
| 1 | DEVICE B | hoge/piyo | 2c |
| 2 | DEVICE A | piyo/fuga | 2c |

FIG. 26B

| INFORMATION ID | APPARATUS INFORMATION | IDENTIFICATION INFORMATION | GATAWAY INFORMATION |
|---|---|---|---|
| 1 | DEVICE A | hoge/hoge | 2a |
| 2 | DEVICE A | hoge/fuga | 2a |
| 3 | DEVICE A | piyo/fuga | 2c |

FIG. 26C

| INFORMATION ID | APPARATUS INFORMATION | IDENTIFICATION INFORMATION | GATAWAY INFORMATION |
|---|---|---|---|
| 1 | DEVICE A | hoge/* | 2a |
| 2 | DEVICE B | hoge/* | 2c |
| 3 | DEVICE A | piyo/* | 2a |

FIG. 27A

| INFORMATION ID | APPARATUS INFORMATION | IDENTIFICATION INFORMATION |
|---|---|---|
| 1 | DEVICE B | hoge/* |

FIG. 27B

| INFORMATION ID | APPARATUS INFORMATION | IDENTIFICATION INFORMATION |
|---|---|---|
| 1 | DEVICE A | hoge/* |
| 2 | DEVICE A | piyo/* |

FIG. 28A

| INFORMATION ID | APPARATUS INFORMATION | DESTINATION |
|---|---|---|
| 1 | DEVICE A | 2a |

FIG. 28B

| INFORMATION ID | APPARATUS INFORMATION | INTEGRATION RATIO (%) |
|---|---|---|
| 1 | DEVICE A | 50 |

FIG. 28C

| INFORMATION ID | APPARATUS INFORMATION | INTEGRATION RATIO (%) |
|---|---|---|
| 1 | DEVICE A | 50 |

FIG. 29A

| INFORMATION ID | APPARATUS INFORMATION | IDENTIFICATION INFORMATION | GATAWAY INFORMATION |
|---|---|---|---|
| 1 | DEVICE B | hoge/piyo | 2c |
| 2 | DEVICE A | piyo/fuga | 2c |
| 3 | DEVICE A | piyo/hoge | 2c |

FIG. 29B

| INFORMATION ID | APPARATUS INFORMATION | IDENTIFICATION INFORMATION | GATAWAY INFORMATION |
|---|---|---|---|
| 1 | DEVICE A | hoge/hoge | 2a |
| 2 | DEVICE A | hoge/fuga | 2a |
| 3 | DEVICE A | piyo/fuga | 2c |
| 4 | DEVICE A | piyo/hoge | 2c |

FIG. 29C

| INFORMATION ID | APPARATUS INFORMATION | IDENTIFICATION INFORMATION | GATAWAY INFORMATION |
|---|---|---|---|
| 1 | DEVICE A | hoge/* | 2a |
| 2 | DEVICE B | hoge/* | 2c |
| 3 | DEVICE A | piyo/* | 2a |

FIG. 30

| INFORMATION ID | APPARATUS INFORMATION | IDENTIFICATION INFORMATION | GATAWAY INFORMATION |
|---|---|---|---|
| 1 | DEVICE A | hoge/* | 2a |
| 2 | DEVICE B | hoge/* | 2c |
| 3 | DEVICE A | piyo/* | 2a |
| 4 | DEVICE A | fuga/* | 2a |
| 5 | DEVICE A | foge/* | 2c |
| 6 | DEVICE B | piyo/* | 2c |

FIG. 31A

| INFORMATION ID | APPARATUS INFORMATION | DESTINATION |
|---|---|---|
| 1 | DEVICE A | 2b |
| 1 | DEVICE C | 2b |

FIG. 31B

| INFORMATION ID | APPARATUS INFORMATION | DESTINATION |
|---|---|---|
| 1 | DEVICE A | 2b |
| 2 | DEVICE C | 2b |

GATEWAY DEVICE AND DATA COLLECTION METHOD

CROSS-REFERENCE TO RELATED APPLICATION

This application is based upon and claims the benefit of priority of the prior Japanese Patent Application No. 2016-203775, filed on Oct. 17, 2016, the entire contents of which are incorporated herein by reference.

FIELD

The embodiments discussed herein are a gateway device and a data collection method.

BACKGROUND

For example, to offer various services to the user, a service provider offering services to the user (hereinafter referred to as provider) builds a business system according to application (hereinafter referred to as information processing system), and runs the system. Specifically, the provider builds the information processing system including a search device that searches for measurement data measured by a plurality of sensors (for example, data such as temperature and humidity in a data center). In this case, the search device collects measurement data measured by the plurality of sensors, and stores the data in a storage device. When receiving a search request from the user, the search device extracts data corresponding to the search request from the data stored in the storage device.

In the search device, when the volume of the measurement data measured by each sensor is enormous, due to limits of storage capacity of the storage device and loads on the network, it may be difficult to store all measurement data in the storage device. Accordingly, the provider arranges a plurality of gateway devices on a communication path between each sensor and the search device. Each gateway device stores the measurement data measured by each sensor, and transmits information indicating the stored measurement data (hereinafter referred to as search key information) to the search device. Thus, the search device may refer to the search key information transmitted from each gateway device to identify the gateway device in which the measurement data corresponding to the search request is stored. Accordingly, the search device may search for measurement data the search request without storing all measurement data measured by each sensor in the storage device (Refer to Japanese Laid-open Patent Publication Nos. 2006-268431 and 2006-350511).

SUMMARY

According to an aspect of the invention, a gateway device that accesses to an information processing device configured to search for data based on search key information corresponding to data transmitted from a plurality of apparatuses, the gateway device includes a memory; and a processor coupled to the memory and configured to, when the data corresponding to the search key information integrated from the plurality of apparatuses is received, transmit the search key information corresponding to the received data to a first gateway device, when the search key information from a second gateway device other than the first gateway device is received and the received search key information is not included in the search key information that has been transmitted to the information processing device, transmit the search key information corresponding to plural pieces of data including the data corresponding to the received search key information to the information processing device, when the data corresponding to the search key information that is not to be integrated from the plurality of apparatuses is received and the search key information corresponding to the received data is not included in the search key information that has been transmitted to the information processing device, transmit the search key information corresponding to plural pieces of data including the received data to the information processing device, and determine whether or not continue to transmit the search key information to the first gateway device based on a first ratio and a second ratio when the gateway device transmits the search key information to the first gateway device, the first ratio being the number of pieces of search key information transmitted to the information processing device to a sum of the number of pieces of data received from the plurality of apparatuses and the number of pieces of search key information received from the second gateway device in the first gateway device, the second ratio being the number of pieces of search key information transmitted to the information processing device to the number of pieces of data received from the plurality of apparatuses in the gateway device when the gateway device does not transmit the search key information to the first gateway device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 26A to 26C are views illustrating specific examples of search key information;

FIGS. 27A and 27B are views illustrating specific examples of integration target information;

FIGS. 28A to 28C are views illustrating specific examples of transmission status information, current integration ratio information, and single integration ratio information;

FIGS. 29A to 29C are views illustrating specific examples of the search key information;

FIG. 30 is a view illustrating a specific example of a specific example of the search key information; and FIGS. 31A and 31B are views illustrating specific examples of the transmission instruction information and transmission status information.

DESCRIPTION OF EMBODIMENTS

When the volume of measurement data measured by each sensor is enormous, even when using a method of collecting search key information by using a search device, the provider may not reduce loads on a network.

Thus, each gateway device transmits/receives the search key information to/from another gateway device, and integrate the search key information into a certain gateway device (hereinafter referred to as representative gateway device). In this manner, the information processing system may cause the representative gateway device to intensively transmit the search key information to the search device. Accordingly, the information processing system may suppress an increase in communication traffic between the search device and each gateway device.

However, in this case, although an increase in communication traffic between the search device and each gateway device may be suppressed, communication traffic between the gateway devices increases. Accordingly, the information processing system may suppress an increase in communication traffic between the gateway devices while preferentially suppressing an increase in communication traffic between the search device and each gateway device, which becomes a bottleneck of communication traffic.

An object of the present disclosure from one aspect is to provide a data collection program, a data collection system, and a data collection method that may reduce a bottleneck of communication traffic, and suppress an increase in communication traffic.

[Configuration of Information Processing System]

Figure 1:
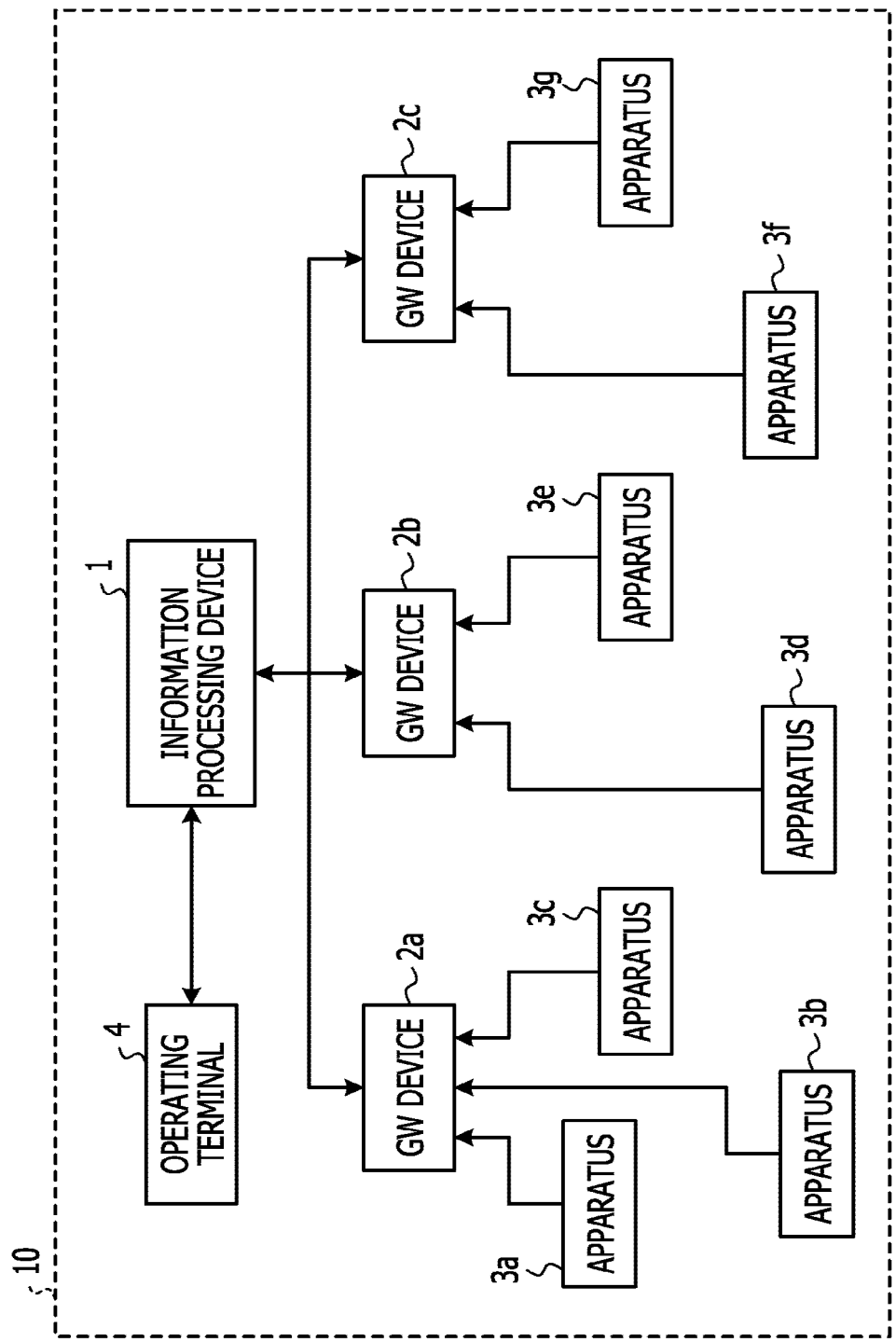
FIG. 1 is a view illustrating a configuration of an information processing system.

FIG. 1 illustrates a configuration of an information processing system 10. The information processing system 10 includes an information processing device 1 (hereinafter also referred to as search device 1), a plurality of gateway devices 2 (hereinafter also referred to as GW device 2), a plurality of sensors 3 (hereinafter also referred to as apparatus 3 or device 3), and an operating terminal 4, for example. Specifically, in the example illustrated in FIG. 1, the information processing system 10 includes the gateway device 2a, 2b, and 2c, the apparatuses 3a, 3b, and 3c that transmit measurement data to the gateway device 2a, the apparatuses 3d and 3e that transmit measurement data to the gateway device 2b, and apparatuses 3f and 3g that transmit measurement data to the gateway device 2c.

The apparatus 3 measures temperature or the like in a data center, and generates measurement data including measured contents. The apparatus 3 transmits the generated measurement data to the gateway device 2. Examples of the apparatus 3 include apparatus fixed to a predetermined position, on-vehicle equipment, and a mobile terminal. Thus, the gateway device 2 to which each apparatus 3 transmits measurement data may be changed.

The gateway device 2 stores the measurement data received from the apparatus 3 in a storage device of its own. The gateway device 2 generates search key information from the measurement data received from the apparatuses 3, and transmits the generated search key information to the information processing device 1.

The information processing device 1 stores the search key information received from the gateway devices 2 in a storage device of its own. Then, at acceptance of a search request for measurement data from the user via the operating terminal 4, the information processing device 1 refers to the search key information stored in the storage device, and identifies the search key information indicating measurement data corresponding to the accepted search request. The information processing device 1 accesses the gateway device 2 indicated by the search key information (gateway device 2 in which measurement data corresponding to the search request is stored), and acquires the measurement data corresponding to the search request. Then, the information processing device 1, for example, transmits the acquired measurement data to the operating terminal 4 that transmits the search request.

[Specific Example of Search for Measurement Data]

Figure 2:
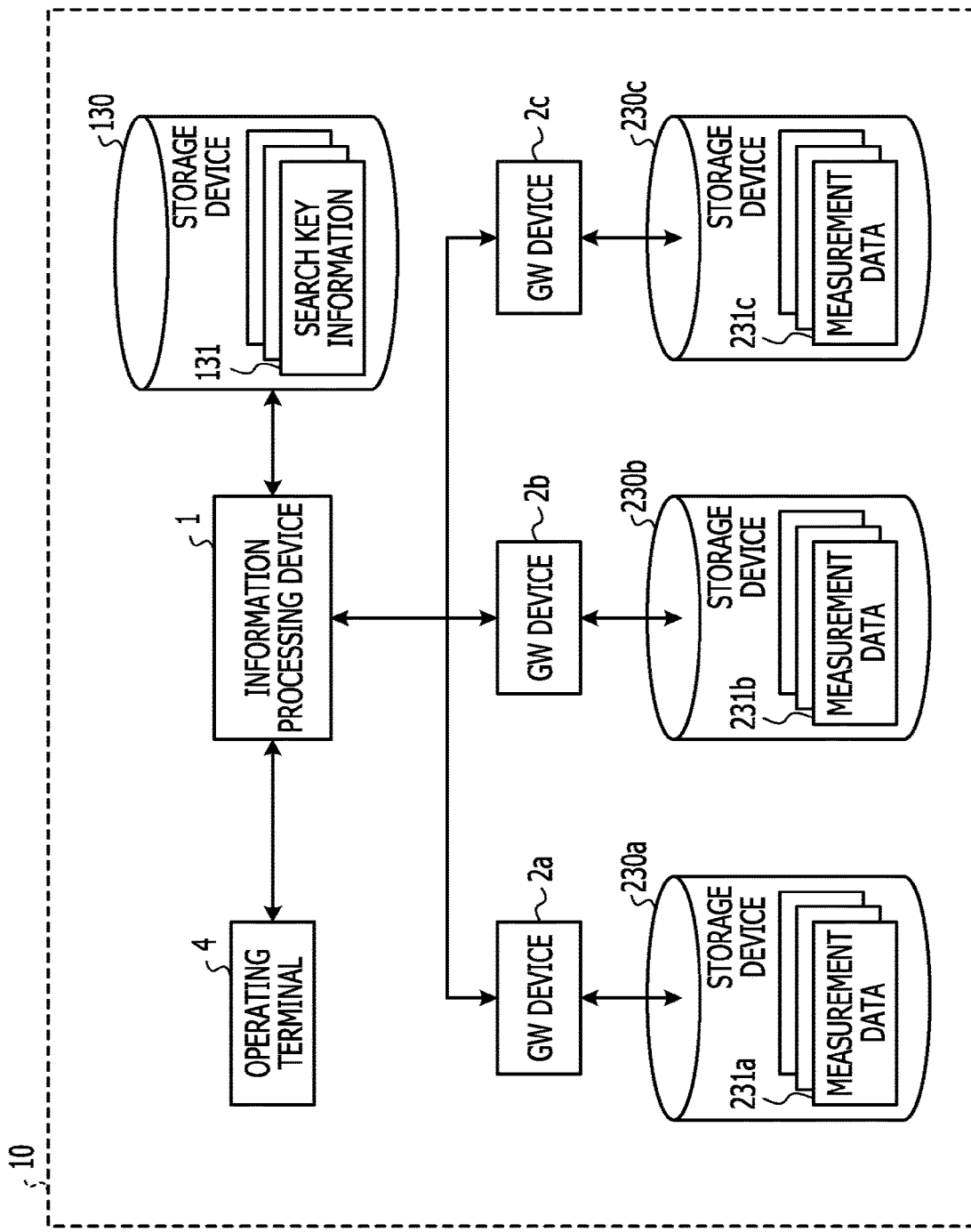
FIG. 2 is a view illustrating a specific example of search for measurement data.

Next, specific examples of search for measurement data will be described. FIG. 2 illustrates a specific example of search for measurement data. Hereinafter, description of the apparatus 3 will be omitted.

In the example illustrated in FIG. 2, the gateway device 2a, 2b, and 2c has storage devices 230a, 230b, and 230c (hereinafter, collectively referred to as storage device 230), respectively. The storage device 230a, 230b, and 230c store measurement data 231a, 231b, and 231c (hereinafter, collectively referred to as measurement data 231) transmitted from the apparatus 3, respectively. In the example illustrated in FIG. 2, the information processing device 1 has a storage device 130. The storage device 130 stores search key information 131 transmitted from each gateway device 2.

Specifically, at receipt of the measurement data 231a transmitted from the apparatus 3a, as illustrated in FIG. 2, the gateway device 2a stores the received measurement data 231a in the storage device 230a. In this case, the gateway device 2a generates the search key information 131 from the received measurement data 231a, and transmits the generated search key information 131 to the information processing device 1. At receipt of the search key information 131 from the gateway device 2a, as illustrated in FIG. 2, the information processing device 1 stores the received search key information 131 in the storage device 130.

When accepting the search request transmitted from the operating terminal 4, the information processing device 1 refers to the search key information 131 stored in the storage device 130, and identifies the search key information 131 indicating the measurement data 231 corresponding to the search request. When the identified search key information 131 indicates the gateway device 2c, the information processing device 1 accesses the storage device 230c of the gateway device 2c, and acquires the measurement data 231c corresponding to the search request.

Here, in the event that the volume of the measurement data 231 measured by each apparatus 3 is enormous, even when using the method of collecting the search key information 131 by the information processing device 1, the information processing system 10 may not reduce loads on a network.

Thus, the information processing system 10 transmits/receives the search key information 131 between the gateway devices 2, and integrates the search key information 131 into a representative gateway device 2. Thereby, the information processing system 10 may cause the representative gateway device 2 to intensively transmit the search key information 131 to the information processing device 1. Thus, the information processing system 10 may suppress an increase in communication traffic between the information processing device 1 and each gateway device 2.

However, in this case, although an increase in communication traffic between the information processing device 1 and each gateway device 2 may be suppressed, communication traffic between the gateway devices 2 increases. Therefore, the provider requests to suppress an increase in communication traffic between the gateway devices 2, which becomes a bottleneck of communication traffic, while preferentially suppressing an increase in communication traffic between the information processing device 1 and each gateway device 2.

When the gateway device 2 in this embodiment receives the measurement data 231 (hereinafter referred to as data) corresponding to the search key information 131 to be integrated from each apparatus 3, the gateway device 2 transmits the search key information 131 corresponding to the received measurement data 231 to the representative gateway device 2.

When the gateway device 2 receives the search key information 131 from another gateway device 2, and the received search key information 131 is not included in the search key information 131 that has been transmitted to the information processing device 1, the gateway device 2 transmits the search key information 131 to the information processing device 1. Specifically, in this case, the gateway device 2 transmits the search key information 131 corresponding to plural pieces of measurement data 231 including the measurement data 231 corresponding to the received search key information 131 to the information processing device 1.

Further, at receipt of the measurement data 231 corresponding to the search key information 131 that is not to be integrated from each apparatus 3, when the search key information 131 corresponding to the received measurement data 231 is not included in the search key information 131 that has been transmitted to the information processing device 1, the gateway device 2 transmits the search key information 131 to the information processing device 1. Specifically, in this case, the gateway device 2 transmits the search key information 131 corresponding to plural pieces of measurement data 231 including the received measurement data 231 to the information processing device 1.

That is, at receipt of the measurement data 231 from the apparatus 3, the gateway device 2 in this embodiment refers to, for example, predetermined information (hereinafter referred to as integrated apparatus information) to determine whether or not the search key information 131 corresponding to the received measurement data 231 is the search key information 131 to be integrated in the representative gateway device 2. When it is determined that search key information 131 corresponding to the received measurement data 231 is the search key information 131 to be integrated, the gateway device 2 transmits the search key information 131 generated from the received measurement data 231 to the representative gateway device 2, and integrates the search key information 131. When it is determined that search key information 131 corresponding to the received measurement data 231 is the search key information 131 that is not to be integrated, the gateway device 2 transmits the search key information 131 generated from the received measurement data 231 to the information processing device 1.

Thereby, gateway device 2 may integrate only the search key information 131 capable of suppressing communication traffic of the information processing system 10 as a whole by integration in the representative gateway device 2. Therefore, the gateway device 2 may efficiently suppress communication traffic of the information processing system 10 as a whole.

In addition, at receipt of the measurement data 231 from the apparatus 3, the gateway device 2 transmits the received measurement data 231 as well as the search key information 131 corresponding to plural pieces of measurement data 231 including other measurement data 231 to the information processing device 1. Specifically, the gateway device 2 transmits the measurement data 231 received from the apparatus 3 as well as search key information 131 corresponding to plural pieces of measurement data 231 that may be received in future to the information processing device 1. Further, at receipt of the search key information 131 from another gateway device 2, the gateway device 2 transmits the measurement data 231 corresponding to the received search key information 131 as well as the search key information 131 corresponding to plural pieces of measurement data 231 including other measurement data 231 to the information processing device 1. Specifically, the gateway device 2 transmits the measurement data 231 corresponding to the search key information 131 received from another gateway device 2 as well as the search key information 131 corresponding to plural pieces of data 231 that may be received in future to the information processing device 1.

Thereby, the gateway device 2 may reduce the frequency of transmitting the search key information 131 to the information processing device 1. Therefore, the gateway device 2 may efficiently suppress communication traffic of the information processing system 10 as a whole.

In this embodiment, when the gateway device concerned is not the representative gateway device 2, the gateway device 2 acquires a ratio (hereinafter referred to as first ratio) of the number of pieces of search key information 131 transmitted to the information processing device 1 to a sum of the number of pieces of measurement data 231 received from the apparatuses 3 and the number of pieces of search key information 131 received from another gateway device 2, in the representative gateway device 2. In addition, when the gateway device concerned is not the representative gateway device 2, the gateway device 2 acquires a ratio (hereinafter referred to as second ratio) of the number of pieces of search key information 131 transmitted to the information processing device 1 to the number of pieces of measurement data 231 received from the apparatuses 3, in the gateway device concerned in the case where the search key information 131 is not transmitted to the representative gateway device 2. Based on the first ratio and the second ratio, the gateway device 2 determines whether or not to continue to transmit the search key information 131 to the representative gateway device 2.

That is, when the gateway device concerned is transmitting the search key information 131 to the representative gateway device 2, the gateway device 2 in this embodiment concerned spontaneously determines whether or not to continue to transmit the search key information 131 to the representative gateway device 2. Specifically, when determined that transmission of the search key information 131 by the gateway device concerned do not suppress an increase in communication traffic of the information processing system 10 as a whole, the gateway devices 2 spontaneously stops transmission of the search key information 131 to the representative gateway device 2.

Thereby, the gateway device 2 may suppress an increase in communication traffic between the gateway devices 2 while preferentially suppressing an increase in communication traffic between the information processing device 1 and each gateway device 2.

[Hardware Configuration of Information Processing System]

Figure 3:
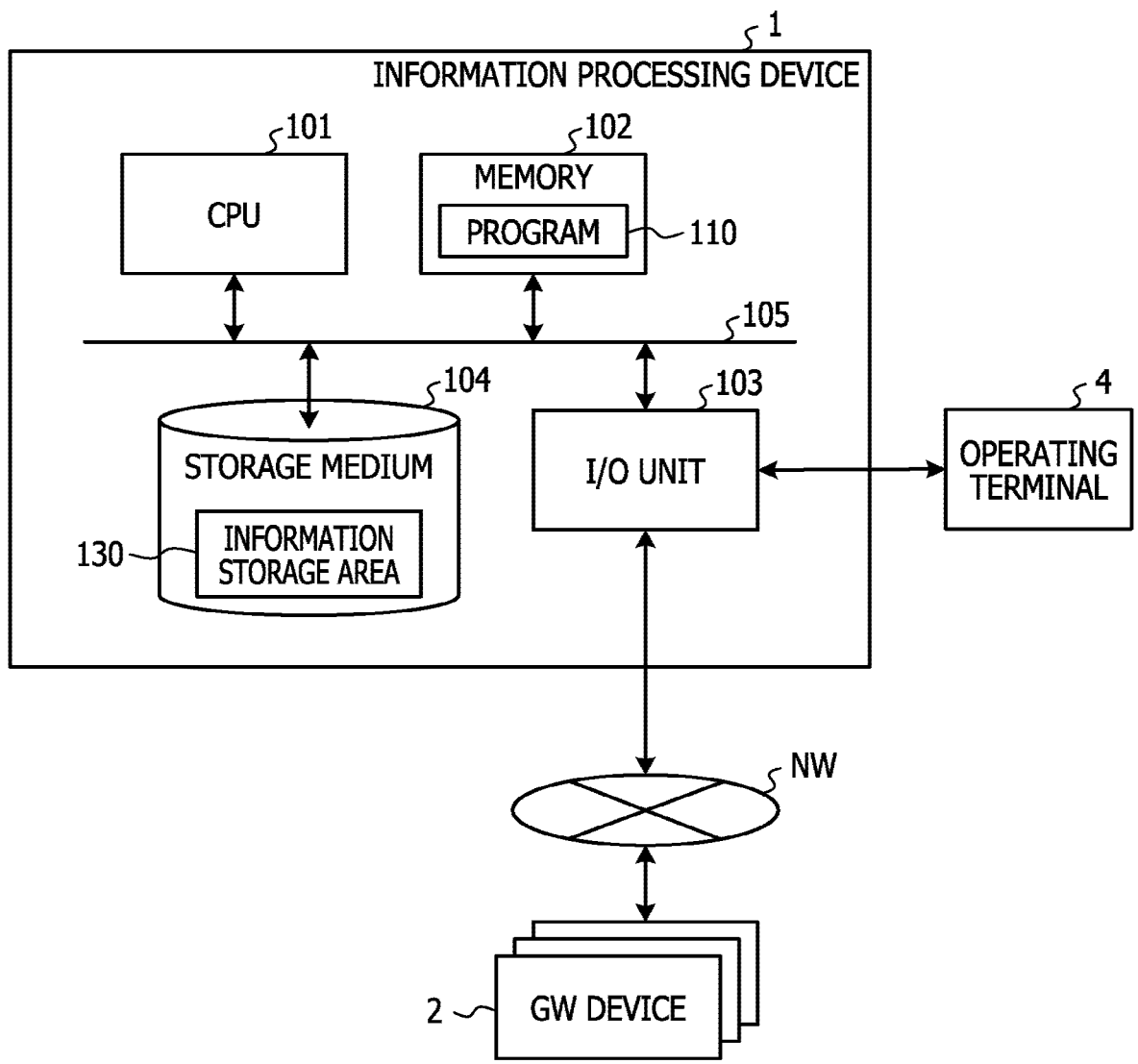
FIG. 3 is a view illustrating hardware configuration of an information processing device.
Figure 4:
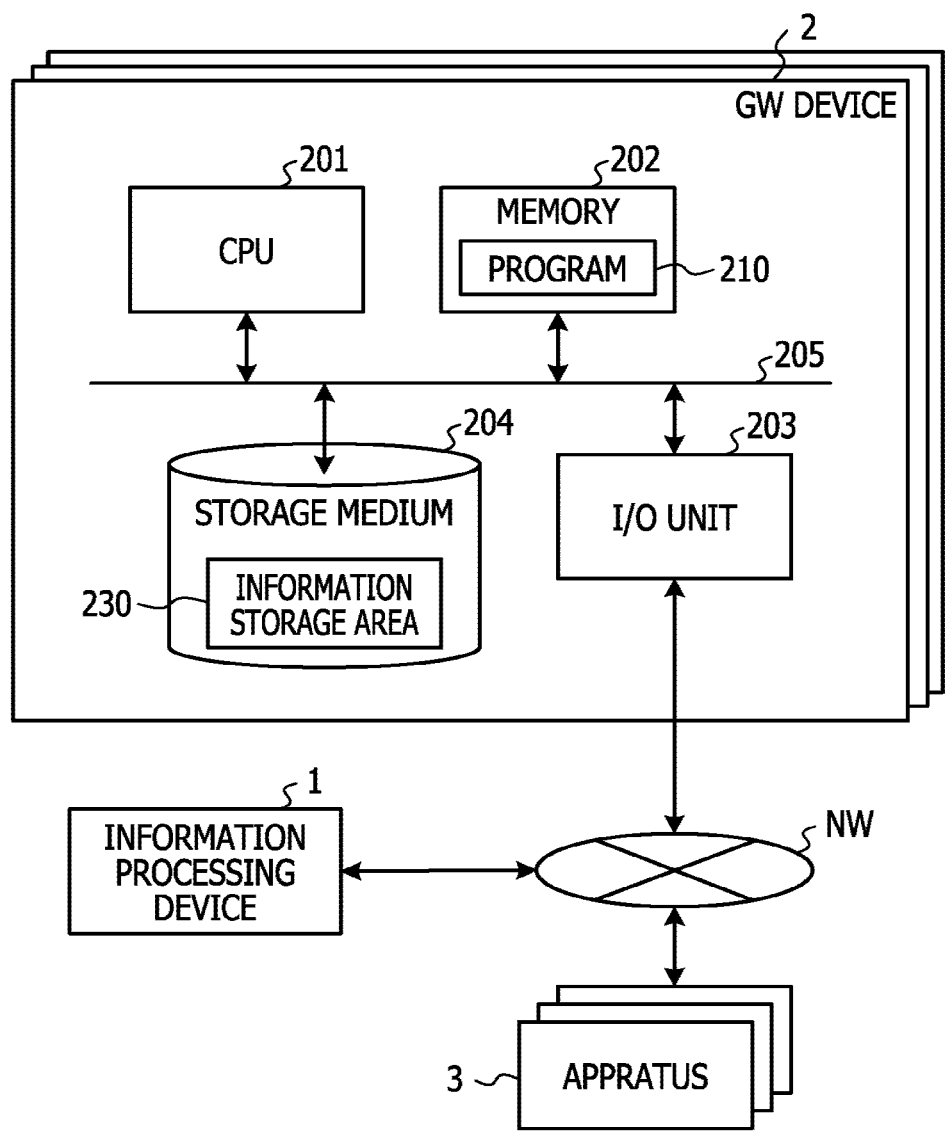
FIG. 4 is a view illustrating hardware configuration of a gateway device.

Next, hardware configuration of the information processing system 10 will be described. FIG. 3 is a view illustrating hardware configuration of the information processing device 1. FIG. 4 is a view illustrating hardware configuration of the gateway device 2.

The information processing device 1 has a CPU 101 that is a processor, a memory 102, an external interface (I/O unit) 103, and a storage medium 104. The components are interconnected via a bus 105.

The storage medium 104 stores a program 110 for executing processing of collecting the search key information 131 (hereinafter referred to as information collection processing) in a program storage area (not illustrated) of the storage medium 104. The storage medium 104 has, for example, an information storage area 130 (hereinafter referred to as storage unit 130) that stores information used in executing the information collection processing. The information storage area 130 corresponds to the storage device 130 in FIG. 1.

As illustrated in FIG. 3, at execution of the program 110, the CPU 101 loads the program 110 from the storage medium 104 into the memory 102, and executes the information collection processing in cooperation with the program 110. The external interface 103 communicates with the gateway device 2 and the operating terminal 4 via a network NW such as Intranet, Internet, or the like.

The gateway device 2 has a CPU 201 that is a processor, a memory 202, an external interface (I/O unit) 203, and a storage medium 204. The components are interconnected via a bus 205.

The storage medium 204 stores a program 210 for executing information collection processing in a program storage area (not illustrated) of the storage medium 204. The storage medium 204 has an information storage area 230 (hereinafter referred to as storage unit 230) that stores information used in executing the information collection processing. The information storage area 230 corresponds to the storage device 230 in FIG. 2.

As illustrated in FIG. 4, at execution of the program 210, the CPU 201 loads the program 210 from the storage medium 204 into the memory 202, and executes the information collection processing in cooperation with the program 210. The external interface 203 communicates with the information processing device 1 and the apparatus 3 via a network NW such as Intranet, Internet, or the like.

[Functions of Information Processing System]

Figure 5:
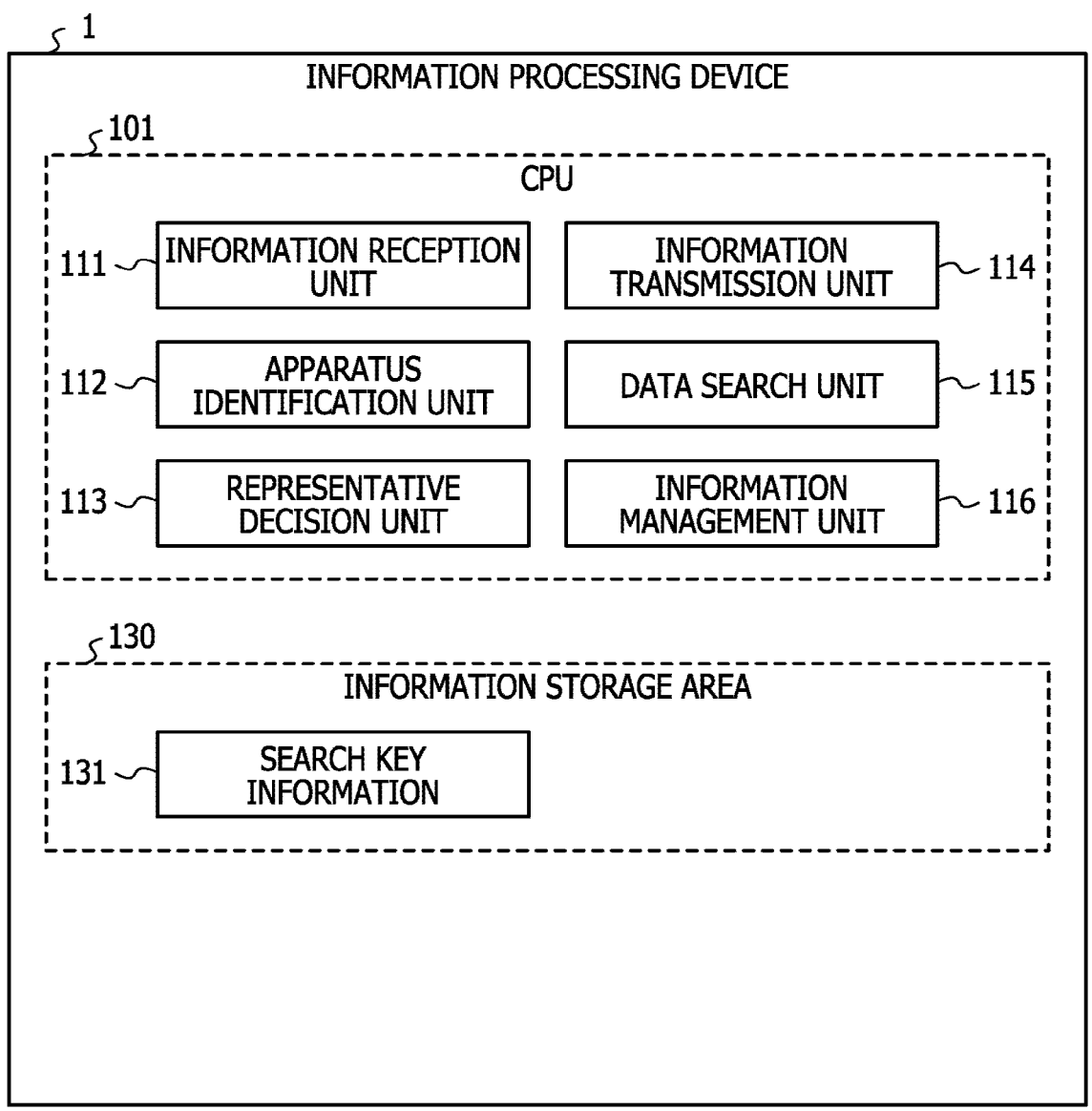
FIG. 5 is a functional block diagram of an information processing device.
Figure 6:
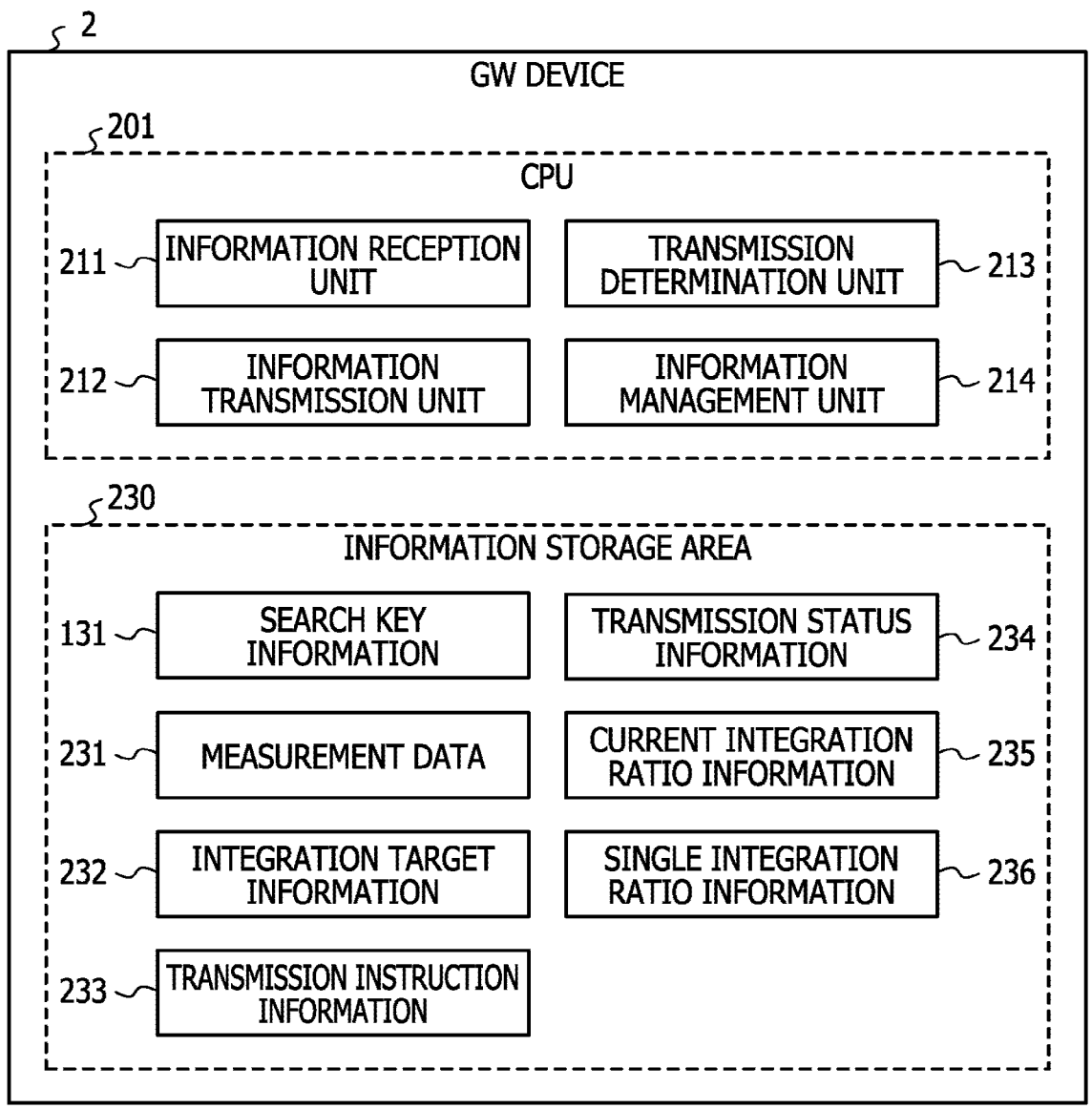
FIG. 6 is a functional block diagram of a gateway device.

Next, functions of the information processing system 10 will be described. FIG. 5 is a functional block diagram of the information processing device 1. FIG. 6 is a functional block diagram of the gateway device 2.

In cooperation with the program 110, the CPU 101 of the information processing device 1 operates as an information reception unit 111, an apparatus identification unit 112, a representative decision unit 113, an information transmission unit 114, a data search unit 115, and an information management unit 116. For example, the search key information 131 is stored in the information storage area 130.

In cooperation with the program 210, the CPU 201 of gateway devices 2 operates as an information reception unit 211, an information transmission unit 212, a transmission determination unit 213, and an information management unit 214. For example, the search key information 131, the measurement data 231, integration target information 232, transmission instruction information 233, transmission status information 234, current integration ratio information 235, and single integration ratio information 236 are stored in the information storage area 230. The search key information 131 stored in the information storage area 230 is the same as the search key information 131 stored in the information storage area 130 of the information processing device 1.

The information reception unit 111 of the information processing device 1 receives the search key information 131 from each gateway device 2. The information management unit 116 of the information processing device 1 stores the search key information 131 transmitted from each gateway device 2 in the information storage area 130. The search key information 131 includes identification information 131a indicating plural pieces of measurement data 231 including the measurement data 231 transmitted from the apparatus 3, and apparatus information 131b indicating the apparatus 3 that transmits the measurement data 231. The search key information 131 includes, for example, gateway information 131c indicating the gateway device 2 that transmits the search key information 131 to the information processing device 1 (the gateway device 2 that generates the search key information 131). A specific example of the search key information 131 will be described later.

For example, the information reception unit 111 receives a search request for the measurement data 231 from the operating terminal 4.

The apparatus identification unit 112 of the information processing device 1 identifies, among the apparatus information 131b included in each piece of the search key information 131 received by the information reception unit 111 a predetermined number of times or more, the apparatus information 131b included in the search key information 131 received from each of a plurality of gateway devices 2 (hereinafter referred to as integrated apparatus information 131b).

The representative decision unit 113 of the information processing device 1 decides, among the plurality of gateway devices 2 that transmit the search key information 131 including the integrated apparatus information 131b identified by the apparatus identification unit 112, the representative gateway device 2 that integrates the search key information 131.

The information transmission unit 114 of the information processing device 1 transmits information indicating the representative gateway device 2 decided by the representative decision unit 113 and the integrated apparatus information 131b to the gateway device 2 that transmits the search key information to the representative gateway device 2 among the plurality of gateway devices 2 that transmit the search key information 131 including the integrated apparatus information 131b.

When the information reception unit 111 receives a search request for the measurement data 231 from the operating terminal 4, the data search unit 115 of the information processing device 1 identifies the search key information 131 including the identification information 131a indicating the measurement data 231 corresponding to the search request. The data search unit 115 accesses the information storage area 230 of the gateway device 2 indicated by the gateway information 131c included in the identified search key information 131, and searches for (identifies) the measurement data 231 corresponding to the search request received by the information reception unit 111.

When plural pieces of search key information 131 corresponding to the measurement data 231 of a search target are present, the data search unit 115 accesses each of the gateway devices 2 indicated by the gateway information 131c included in each piece of search key information 131 until the measurement data 231 of the search target is identified.

The information reception unit 211 of the gateway device 2 receives the measurement data 231 from each apparatus 3. When the gateway device concerned is the representative gateway device 2, the information reception unit 211 receives the search key information 131 from another gateway device 2. The information management unit 214 of the gateway device 2 stores the received measurement data 231 and the search key information 131 in the information storage area 230.

When the gateway device concerned is the gateway device 2 that transmits the search key information 131 to the representative gateway device 2, the information reception unit 211 receives the current integration ratio information 235 calculated by the representative gateway device 2. The current integration ratio information 235 will be described later.

When the information reception unit 211 receives the measurement data 231 from the apparatus 3 corresponding to the integrated apparatus information 131b received from the information processing device 1, the information transmission unit 212 of the gateway device 2 transmits the search key information 131 to the representative gateway device 2. Specifically, in this case, the information transmission unit 212 transmits the search key information 131 including the identification information 131a indicating the measurement data 231 received by the information reception unit 211 and the apparatus information 131b corresponding to the apparatus 3 that transmits the received measurement data 231 to the representative gateway device 2.

When the information reception unit 211 receives the search key information 131 including no identification information 131a that has been transmitted to the information processing device 1 from another gateway device 2, the information transmission unit 212 transmits the search key information 131 to the information processing device 1. Specifically, in this case, the information transmission unit 212 transmits the search key information 131, which includes the identification information 131a indicating plural pieces of measurement data 231 including measurement data 231 indicated by the identification information 131a included in the search key information 131 received by the information reception unit 211, and the apparatus information 131b included in the search key information 131 received by the information reception unit 211, to the information processing device 1.

Further, when the information reception unit 211 receives the measurement data 231 that does not correspond to the identification information 131a that has been transmitted to the information processing device 1 from the apparatus 3 that does not correspond to the integrated apparatus information 131b received from the information processing device 1, the information transmission unit 212 transmits the search key information 131 to the information processing device 1. Specifically, in this case, the information transmission unit 212 transmits the search key information 131, which includes the identification information 131a indicating plural pieces of measurement data 231 including the measurement data 231 received by the information reception unit 211, and the apparatus information 131b corresponding to the apparatus 3 that transmits the measurement data 231 received by the information reception unit 211, to the information processing device 1.

When the gateway device concerned is the representative gateway device 2, the information management unit 214 calculates the current integration ratio information 235. The current integration ratio information 235 is a ratio (first ratio) of the number of pieces of search key information 131 transmitted to the information processing device 1 to a sum of the number of pieces of the measurement data 231 received from the apparatuses 3 and the number of pieces of search key information 131 received from anther gateway devices 2, in the representative gateway device 2. The current integration ratio information 235 may be calculated for each piece of apparatus information 131b.

The information management unit 214 stores the calculated current integration ratio information 235 in the information storage area 230. The information transmission unit 212 transmits the calculated current integration ratio information 235 to each gateway device 2 that transmits the search key information 131 to the representative gateway device 2.

Further, when the gateway device concerned is the gateway device 2 that transmits the search key information 131 to the representative gateway device 2, the information management unit 214 calculates the single integration ratio information 236. The single integration ratio information 236 is a ratio (second ratio) of the number of pieces of search key information 131 transmitted to the information processing device 1 to the number of pieces of measurement data 231 received from each apparatus 3, in the gateway device concerned in the case where the search key information 131 is not transmitted to the representative gateway device 2. For example, the single integration ratio information 236 may be calculated for each piece of apparatus information 131b.

The information management unit 214 stores the calculated single integration ratio information 236 in the information storage area 230.

When the gateway device concerned is the gateway device 2 that transmits the search key information 131 to the representative gateway device 2, the information management unit 214 stores the current integration ratio information 235 received by the information reception unit 211 in the information storage area 230.

When the gateway device concerned is the gateway device 2 that transmits the search key information 131 to the representative gateway device 2, the transmission determination unit 213 of the gateway device 2 acquires the current integration ratio information 235. Specifically, when the current integration ratio information 235 transmitted from the representative gateway device 2 is stored in the information storage area 230, the transmission determination unit 213 acquires the current integration ratio information 235 stored in the information storage area 230. The transmission determination unit 213 acquires the single integration ratio information 236 stored in the information storage area 230. Further, based on the acquired current integration ratio information 235 and single integration ratio information 236, the transmission determination unit 213 determines whether or not to continue to transmit the search key information 131 to the representative gateway device 2. The integration target information 232, the transmission instruction information 233, and the transmission status information 234 will be described later.

[First Embodiment]

Figure 7:
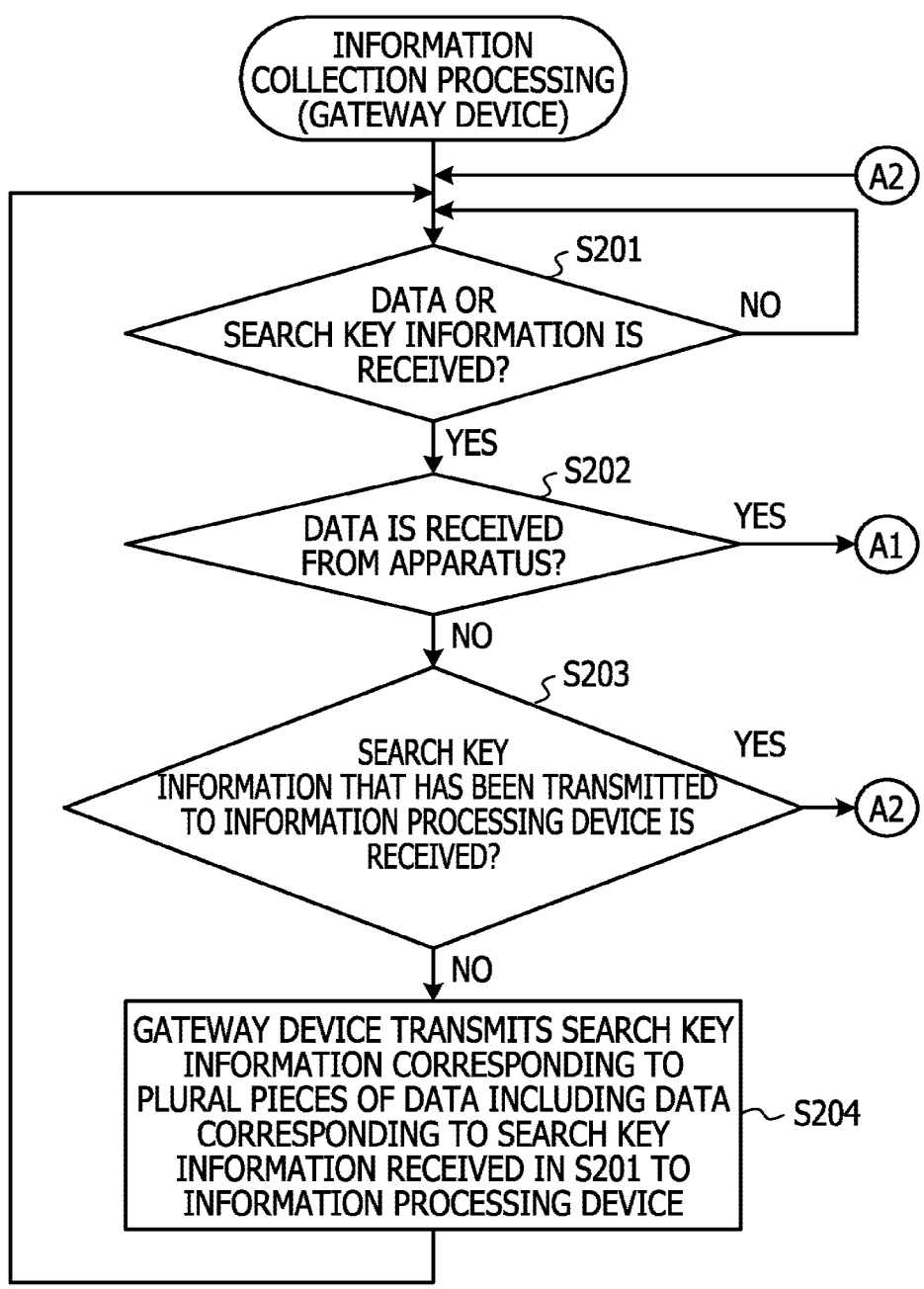
FIG. 7 is a flowchart schematically illustrating information collection processing in First embodiment.
Figure 8:
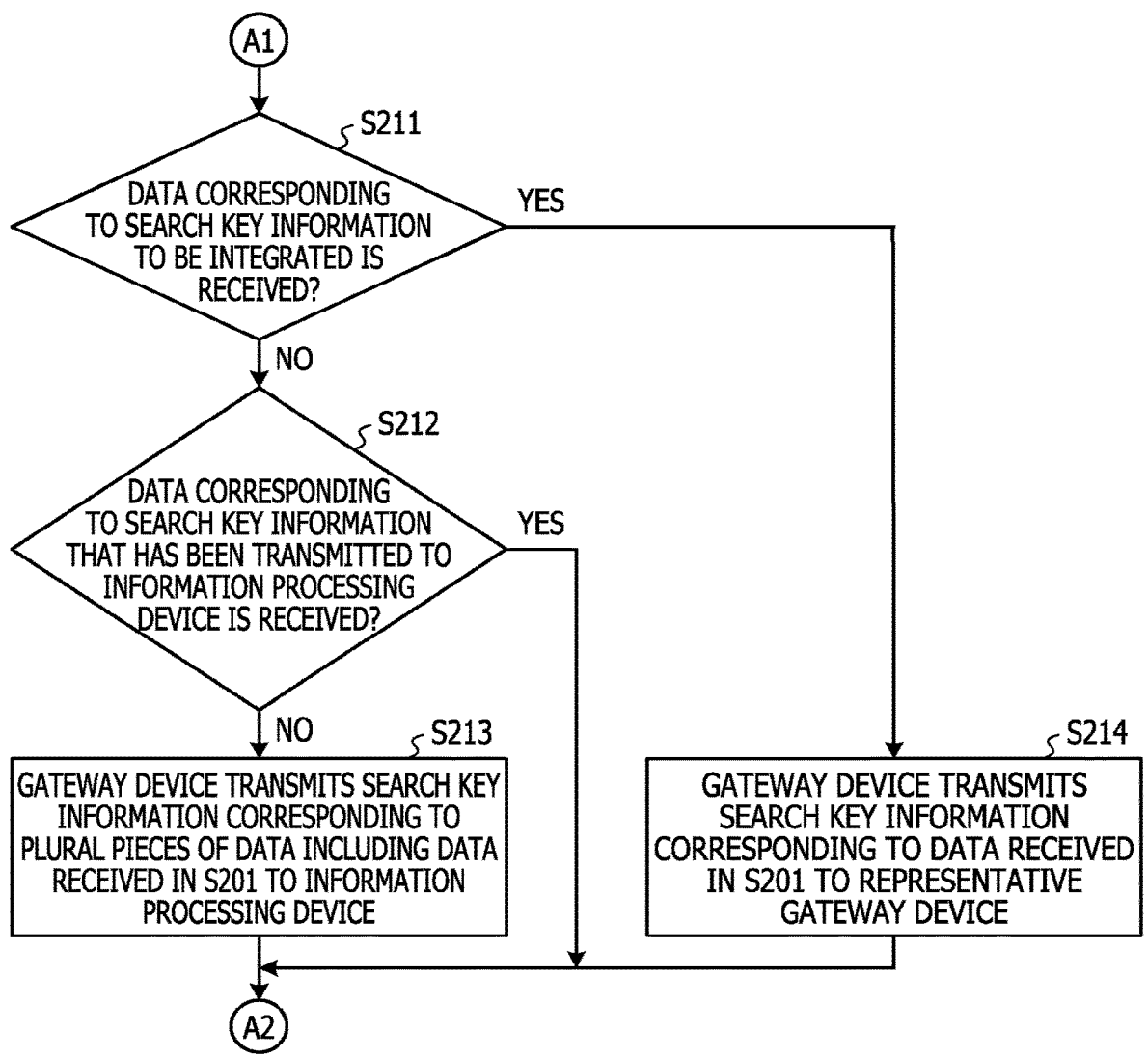
FIG. 8 is a flowchart schematically illustrating the information collection processing in First embodiment.
Figure 9:
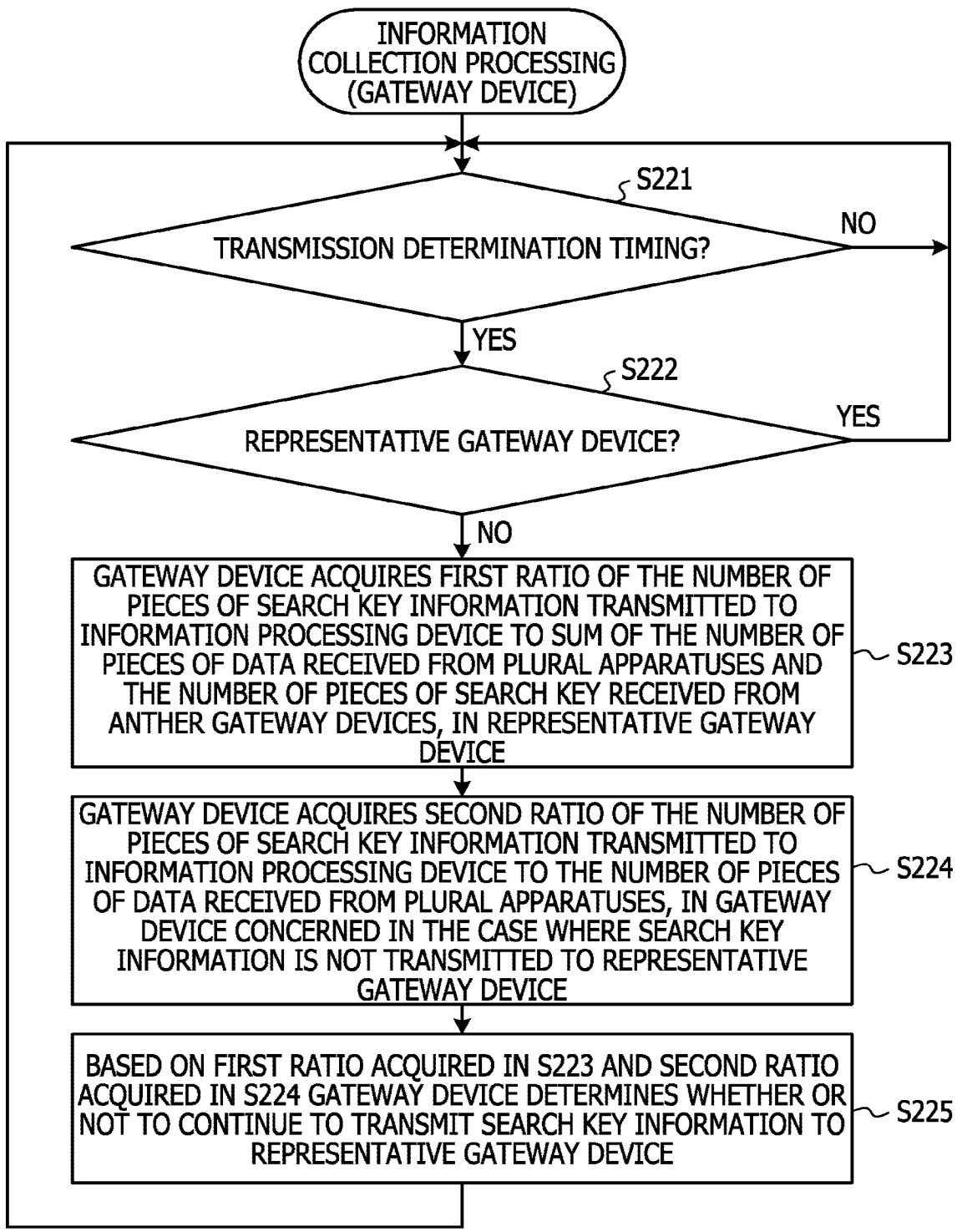
FIG. 9 is a flowchart schematically illustrating the information collection processing in First embodiment.

Next, First embodiment will be described. FIGS. 7 to 9 are flowcharts schematically illustrating information collection processing in First embodiment.

As illustrated in FIG. 7, the gateway device 2 wait until the gateway device 2 receives the measurement data 231 from each apparatus 3 or receives the search key information 131 from another gateway device 2 (NO in S201). When receiving the search key information 131 from another gateway device 2 (YES in S201, NO in S202), the gateway devices 2 determines whether or not the search key information 131 received in the processing in S201 is the search key information 131 that has been transmitted to the information processing device 1 (S203).

As a result, the search key information 131 received in the processing in S201 is the search key information 131 that has not been transmitted to the information processing device 1 (NO in S203), the gateway device 2 transmits the search key information 131 to the information processing device 1 (S204). Specifically, in this case, the gateway device 2 transmits the search key information 131 corresponding to plural pieces of measurement data 231 including the measurement data 231 corresponding to the search key information 131 received in the processing in S201 to the information processing device 1. On the contrary, when the search key information 131 received in the processing in S201 is the search key information 131 that has been transmitted to the information processing device 1 (YES in S203), the gateway device 2 executes the processing in S201 or subsequent steps again.

Thereby, when the search key information 131 newly received from another gateway device 2 is included in the search key information 131 that has been transmitted to the information processing device 1, the gateway device 2 may omit transmission of the newly received search key information 131. Therefore, the gateway device 2 may reduce the frequency of transmitting the search key information 131 to the information processing device 1.

When receiving the measurement data 231 from each apparatus 3 (YES in S201, YES in S202), as illustrated in FIG. 8, the gateway devices 2 determines whether or not the measurement data 231 received in processing in S201 is the measurement data 231 corresponding to the search key information 131 to be integrated (S211). Specifically, the gateway device 2 refers to the integration target information 232 indicating the measurement data 231 corresponding to the search key information 131 to be integrated to determine whether or not the measurement data 231 received in processing in S201 is the measurement data 231 corresponding to the search key information 131 to be integrated.

When the measurement data 231 received in the processing in S201 is not the measurement data 231 corresponding to the search key information 131 to be integrated (NO in S211), the gateway device 2 determines whether or not the search key information 131 received in the processing in S201 is the search key information 131 that has been transmitted to the information processing device 1 (S212). As a result, when the search key information 131 received in the processing in S201 is the search key information 131 that has not been transmitted to the information processing device 1 (NO in S212), the gateway device 2 transmits the search key information 131 corresponding to plural pieces of measurement data 231 including the measurement data 231 received in the processing in S201 to the information processing device 1 (S213). Then, the gateway device 2 executes the processing in S201 and subsequent steps again. When the search key information 131 received in the processing in S201 is the search key information 131 that has been transmitted to the information processing device 1 (YES in S212), the gateway device 2 does not execute the processing in S204.

On the contrary, when the measurement data 231 received in the processing in S201 is the measurement data 231 corresponding to the search key information 131 to be integrated (YES in S211), the gateway device 2 transmits the search key information 131 corresponding to the measurement data 231 received in the processing in S201 to the representative gateway device 2 (S214). Then, the gateway device 2 executes the processing in S201 and subsequent steps.

That is, when receiving the measurement data 231 corresponding to the search key information 131 to be integrated, the gateway device 2 determines that the gateway device concerned is the gateway device 2 that transmits the search key information 131 to the representative gateway device 2. Thus, when receiving the measurement data 231 corresponding to the search key information 131 to be integrated, the gateway devices 2 transmits the search key information 131 to the representative gateway device 2 without transmitting the search key information 131 to the information processing device 1.

In this manner, the gateway device 2 may transmit only the search key information 131 corresponding to the measurement data 231 capable of reducing entire communication traffic by integration into the representative gateway device 2 according to contents of the integration target information 232 to the representative gateway device 2.

As illustrated in FIG. 9, the gateway devices 2 waits until a transmission determination timing comes (NO in S221). The transmission determination timing is the timing when the gateway device determines whether or not to continue to transmit the search key information 131 to the representative gateway device 2. Specifically, the transmission determination timing may be periodical.

At the transmission timing, when determining that the gateway device concerned is the gateway device 2 that transmits the search key information 131 to the representative gateway device 2 (YES in S221, NO in S222), the gateway devices 2 acquires the first ratio and the second ratio (S223, S224). Then, based on the first ratio acquired in the processing in S223 and the second ratio acquired in the processing in S224, the gateway device 2 determines whether or not to continue to transmit the search key information 131 to the representative gateway device 2 (S225).

That is, for example, the integration target information 232 is generated by the information processing device 1 and however, may not be often updated due to processing loads caused by collecting information from each gateway device 2. Thus, based on information held in each gateway device 2, the gateway device 2 spontaneously determines whether or not to continue to transmit the search key information 131 to the representative gateway device 2.

Thereby, even when the information processing device 1 does not often update the integration target information 232, the gateway device 2 may efficiently reduce communication traffic of the information processing system 10 as a whole. The gateway device 2 may reduce communication traffic occurring due to frequent reception of the integration target information 232 from the information processing device 1.

In the processing in S222, when it is determined that the gateway device concerned is the gateway device 2 that receives the search key information 131 transmitted from another gateway devices 2 (representative gateway device 2) (YES in S222), the gateway device 2 executes the processing in S221 and subsequent steps again.

When receiving the measurement data 231 corresponding to the search key information 131 to be integrated from the plurality of apparatuses 3, the gateway device 2 in this embodiment transmits the search key information 131 corresponding to the received measurement data 231 to the representative gateway device 2.

When the gateway device 2 receives the search key information 131 from another gateway device 2, and the received search key information 131 is not included in the search key information 131 that has been transmitted to the information processing device 1, the gateway device 2 transmits the search key information 131 to the information processing device 1. Specifically, in this case, the gateway device 2 transmits the search key information 131 corresponding to plural pieces of measurement data 231 including the measurement data 231 corresponding to the received search key information 131 to the information processing device 1.

Further, at receipt of the measurement data 231 corresponding to the search key information 131 not to be integrated from the plurality of apparatuses 3, when the search key information 131 corresponding to the received measurement data 231 is not included in the search key information 131 that has been transmitted to the information processing device 1, the gateway device 2 transmits the search key information 131 to the information processing device 1. Specifically, in this case, the gateway device 2 transmits the search key information 131 corresponding to plural pieces of measurement data 231 including the received measurement data 231 to the information processing device 1.

When the gateway device concerned is not the representative gateway device 2, the gateway device 2 acquires the first ratio of the number of pieces of search key information 131 transmitted to the information processing device 1 to a sum of the number of pieces of measurement data 231 received from the plurality of apparatuses 3 and the number of pieces of search key information 131 received from another gateway device 2, in the representative gateway device 2. The gateway device 2 acquires the second ratio of the number of pieces of search key information 131 transmitted to the information processing device 1 to the number of pieces of measurement data 231 received from the plurality of apparatuses 3, in the gateway device concerned in the case where the search key information 131 is not transmitted to the representative gateway device 2. Based on the first ratio and the second ratio, the gateway device 2 determines whether or not to continue to transmit the search key information 131 to the representative gateway device 2.

Thereby, the gateway device 2 may suppress an increase in communication traffic between the gateway devices 2 while preferentially suppressing an increase in communication traffic between the information processing device 1 and each gateway device 2.

[Details of First Embodiment]

Next, details of First embodiment will be described. FIGS. 10 to 19 are flowcharts illustrating details of information collection processing in First embodiment. FIGS. 20 to 31B are views illustrating the information collection processing in First embodiment. With reference to FIGS. 20 to 31B, details of the information collection processing in FIGS. 10 to 19 will be described.

[Information Collection Processing of Gateway Device]

Figure 10:
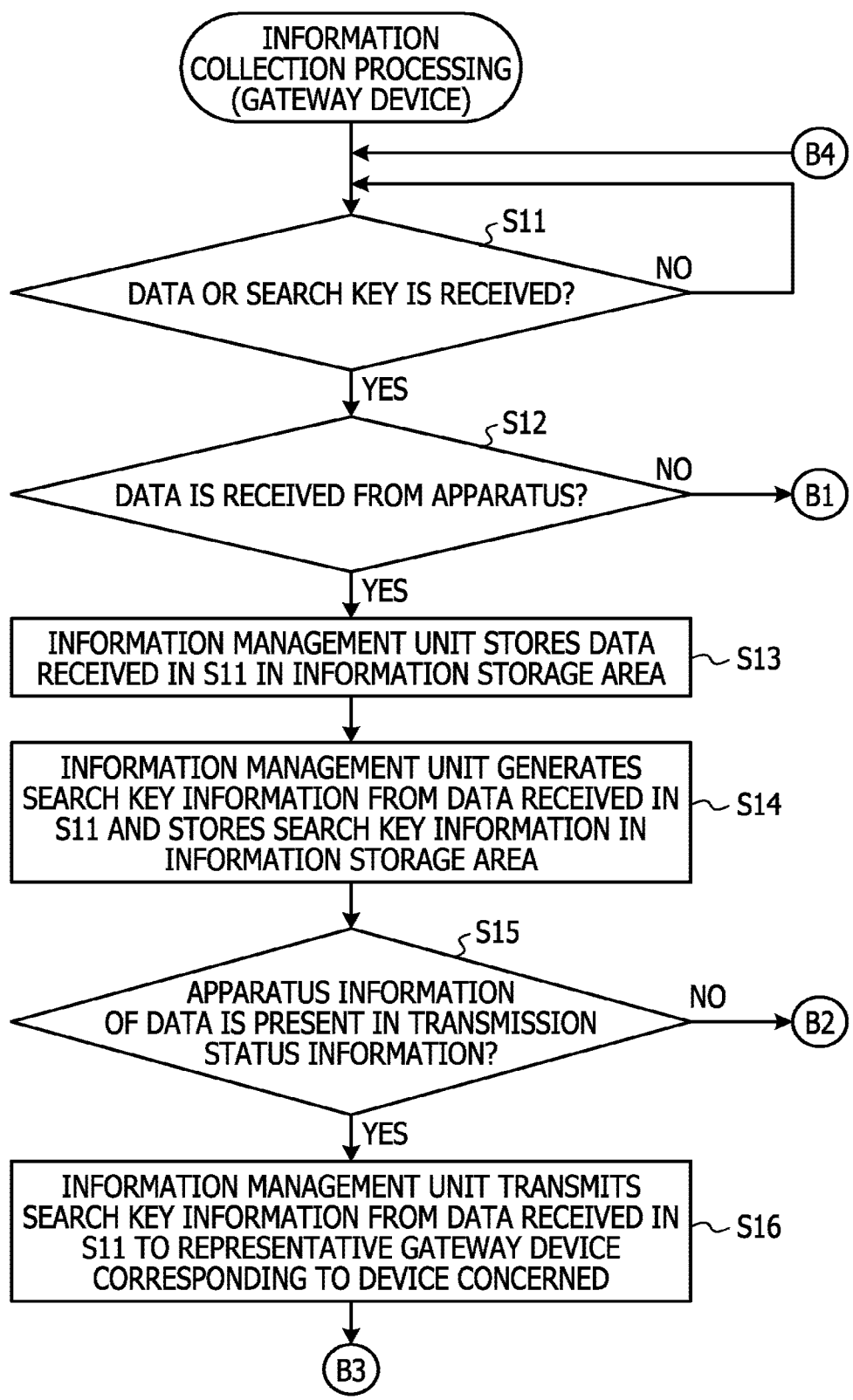
FIG. 10 is a flowchart illustrating the information collection processing in First embodiment in detail.
Figure 11:
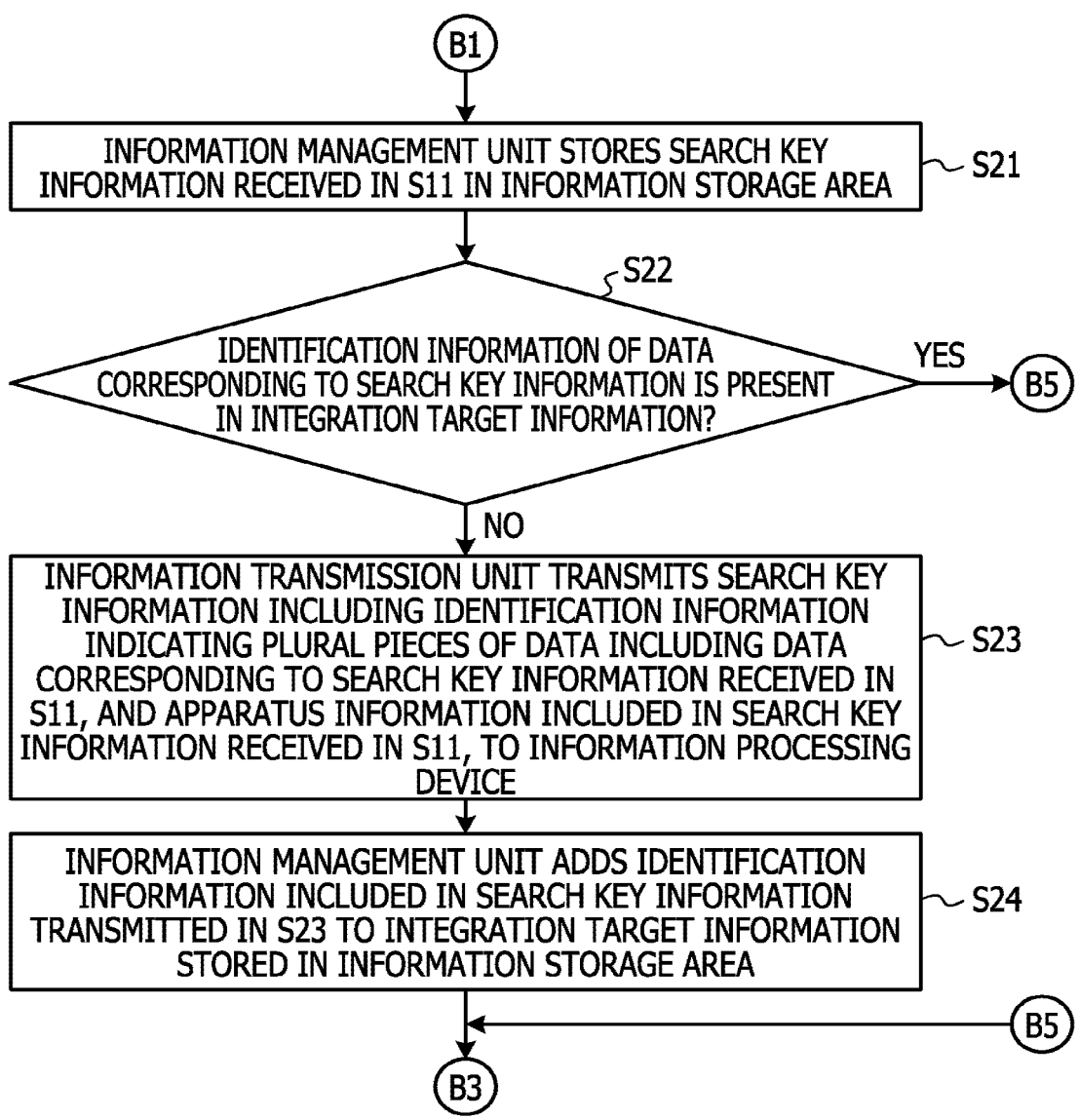
FIG. 11 is a flowchart illustrating the information collection processing in First embodiment in detail.
Figure 12:
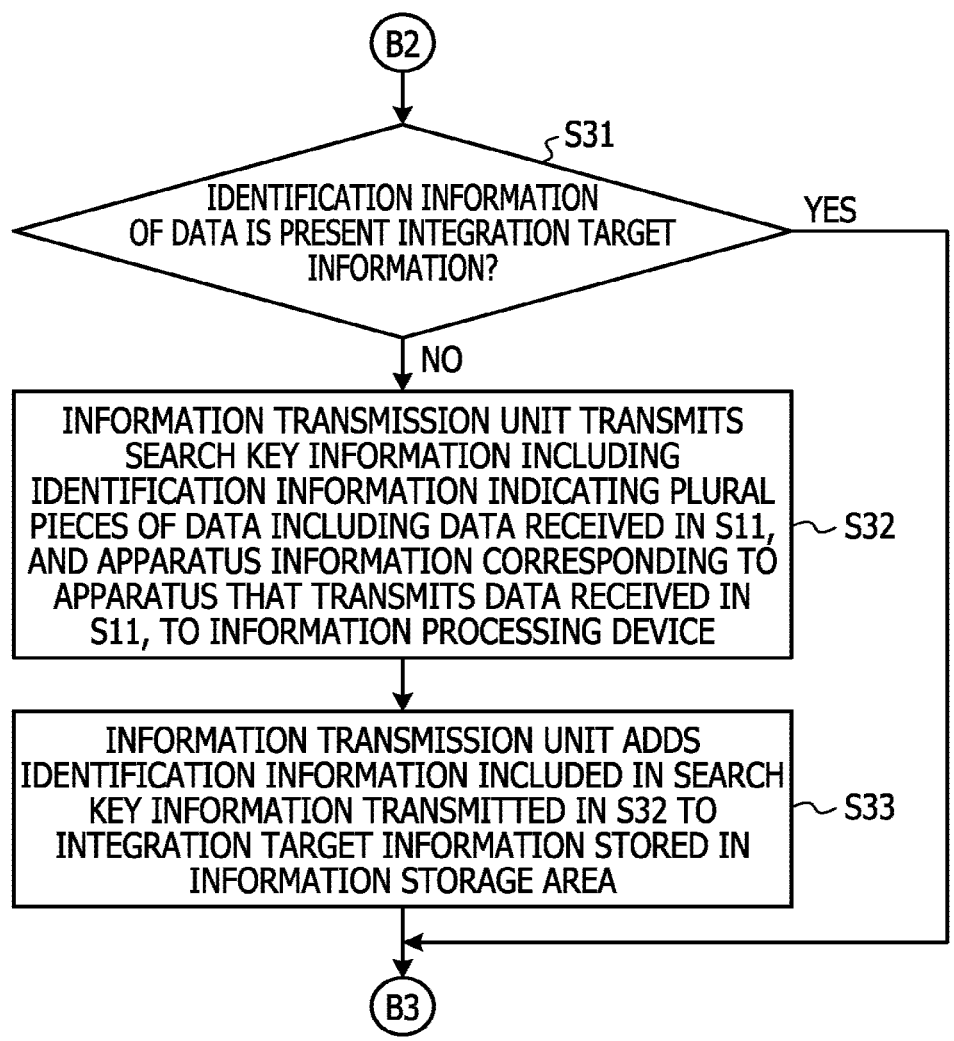
FIG. 12 is a flowchart illustrating the information collection processing in First embodiment in detail.
Figure 20:
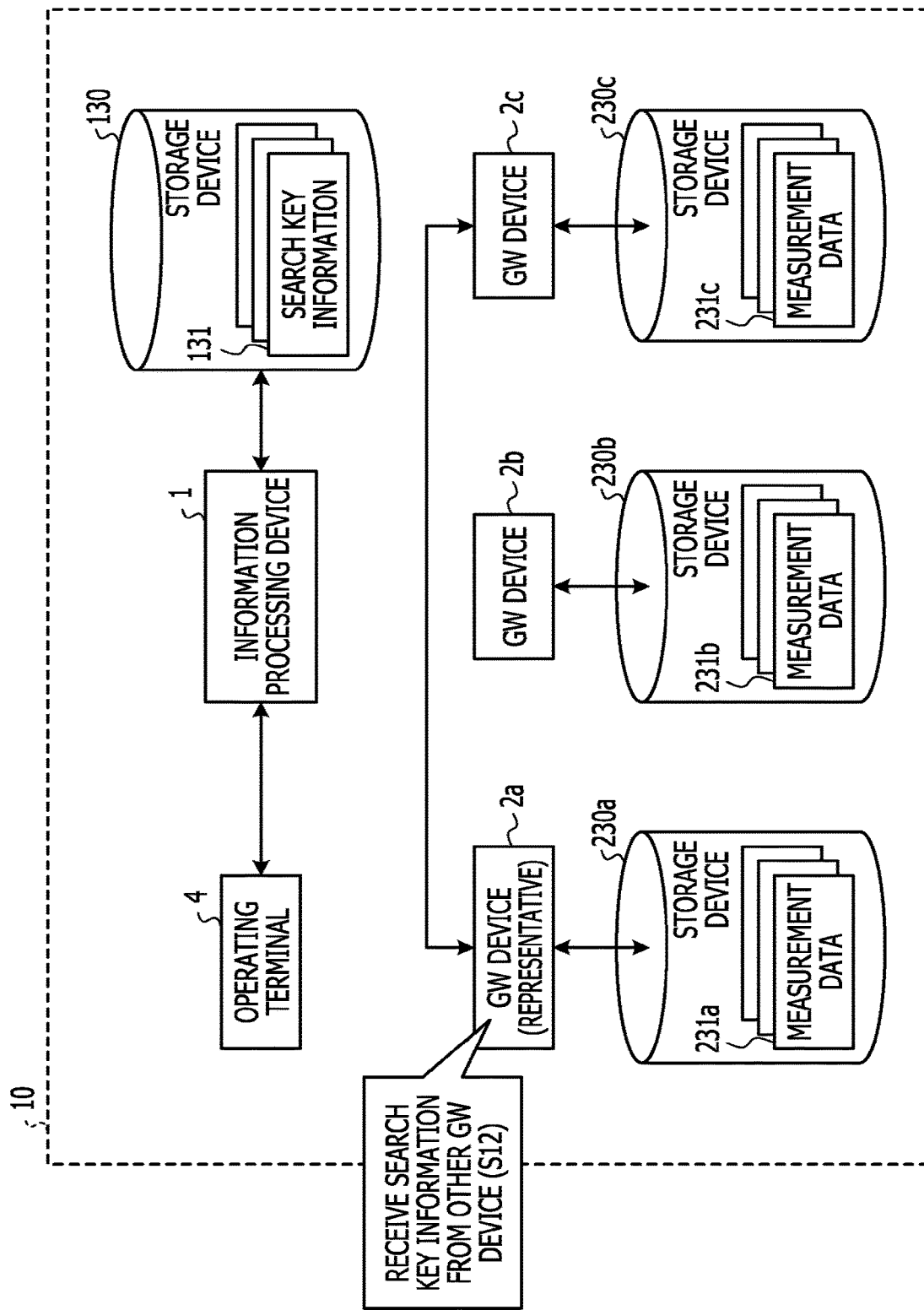
FIG. 20 is a flowchart illustrating the information collection processing in First embodiment in detail.

First, the information collection processing of the gateway device 2 will be described. As illustrated in FIG. 10, the information reception unit 211 of the gateway device 2 waits until the gateway device 2 receives the measurement data 231 from each apparatus 3, or receives the search key information 131 from another gateway device 2 (NO in S11). When receiving the search key information 131 from another gateway device 2 (YES in S11, NO in S12), as illustrated in FIG. 11, the information management unit 214 of the gateway device 2 stores the search key information 131 received in the processing in S11 in the information storage area 230 (S21). That is, receiving the search key information 131 from another gateway device 2, represents, as illustrated in FIG. 20, that the gateway device concerned (gateway device 2a) is the representative gateway device 2 that integrates the search key information 131.

Figure 21:
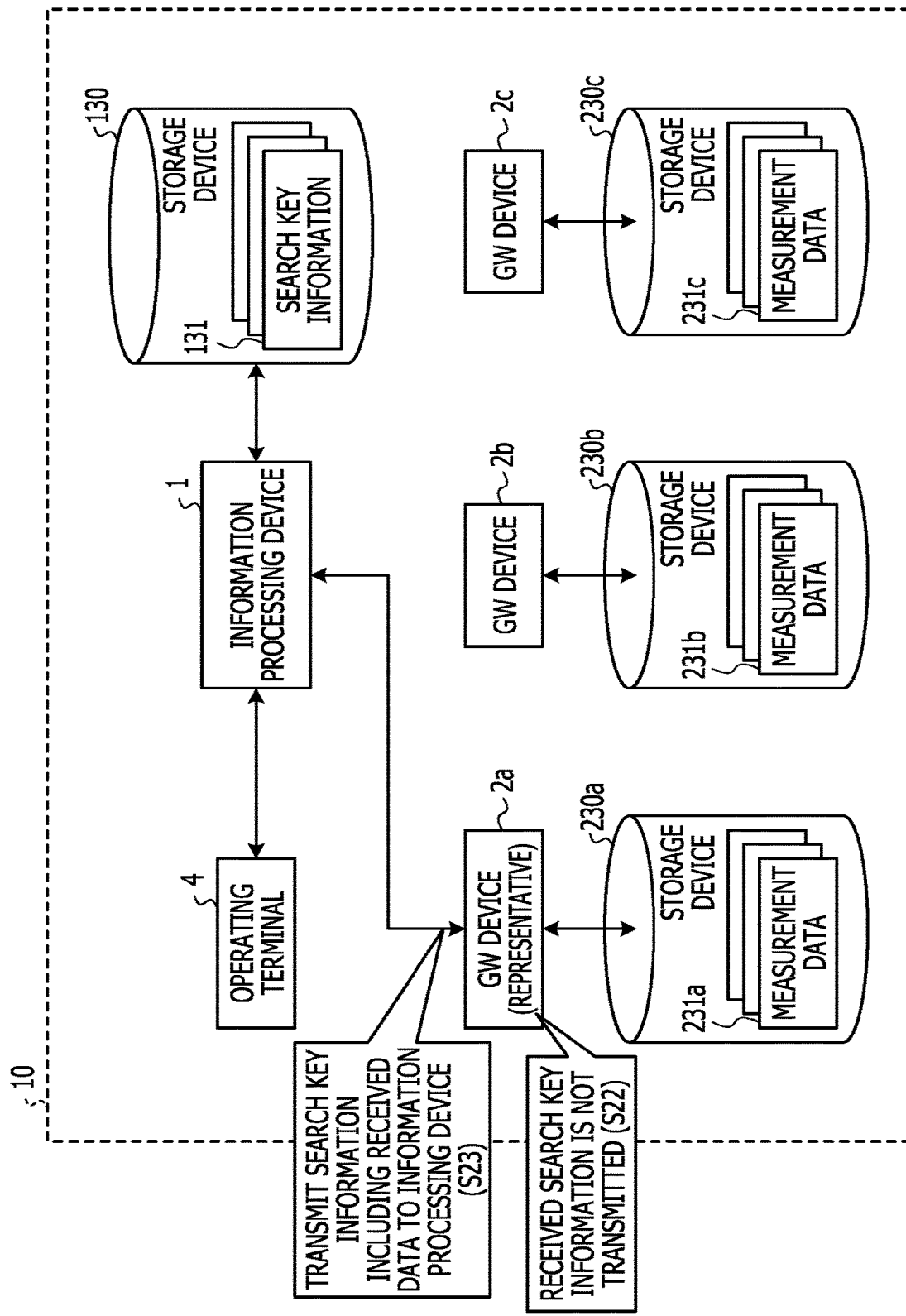
FIG. 21 is a flowchart illustrating the information collection processing in First embodiment in detail.

Then, as illustrated in FIG. 21, the information transmission unit 212 of the gateway device 2 determines whether or not the identification information 131a corresponding to the measurement data 231 corresponding to the search key information 131 received in the processing in S11 is included in the integration target information 232 (S22). That is, the information transmission unit 212 determines whether or not the search key information 131 including contents of the search key information 131 transmitted from another gateway device 2 has been transmitted to the information processing device 1.

As a result, when the identification information 131a is not included in the integration target information 232 (NO in S22), the information transmission unit 212 transmits the search key information 131 to the information processing device 1 (S23). Specifically, in the processing in S23, the information transmission unit 212 transmits the search key information 131, which includes the identification information 131a indicating plural pieces of measurement data 231 including the measurement data 231 corresponding to the search key information 131 received in the processing in S11, and the apparatus information 131b included in the search key information 131 received in the processing in S11, to the information processing device 1.

Then, the information management unit 214 adds the identification information 131a included in the search key information 131 transmitted to the information processing device 1 in the processing in S23 to the integration target information 232 stored in the information storage area 230 (S24).

Thereby, when the identification information 131a of the measurement data 231 corresponding to the search key information 131 newly received from another gateway device 2 is included in the search key information 131 that has been transmitted to the information processing device 1, the gateway device 2 may omit transmission of the newly received search key information 131. Therefore, the gateway device 2 may reduce the frequency of transmitting the search key information 131 to the information processing device 1.

On the contrary, when the identification information 131a corresponding to the measurement data 231 corresponding to the search key information 131 received in the processing in S11 is included in the integration target information 232 (YES in S22), the information transmission unit 212 and the information management unit 214 do not execute the processing in S23 and S24. That is, in this case, the information transmission unit 212 does not transmit the search key information 131 to the information processing device 1.

Returning to FIG. 10, when the gateway device 2 receives the measurement data 231 from each apparatus 3 (YES in S11, YES in S12), the information management unit 214 stores the measurement data 231 received in the processing in S11 in the information storage area 230 (S13). In this case, the information management unit 214 generates the search key information 131 from the measurement data 231 received in the processing in S11, and stores the search key information 131 in the information storage area 230 (S14).

Then, the information transmission unit 212 determines whether or not the apparatus information 131b of the measurement data 231 received in the processing in S11 is included in the transmission status information 234 (S15). The transmission status information 234 includes the apparatus information 131b corresponding to the measurement data 231 integrated in the representative gateway device 2, and information indicating the representative gateway device 2. That is, the information transmission unit 212 refers to the transmission status information 234 to determine whether or not the search key information 131 corresponding to the measurement data 231 received in the processing in S11 is transmitted to the representative gateway device 2.

Figure 22:
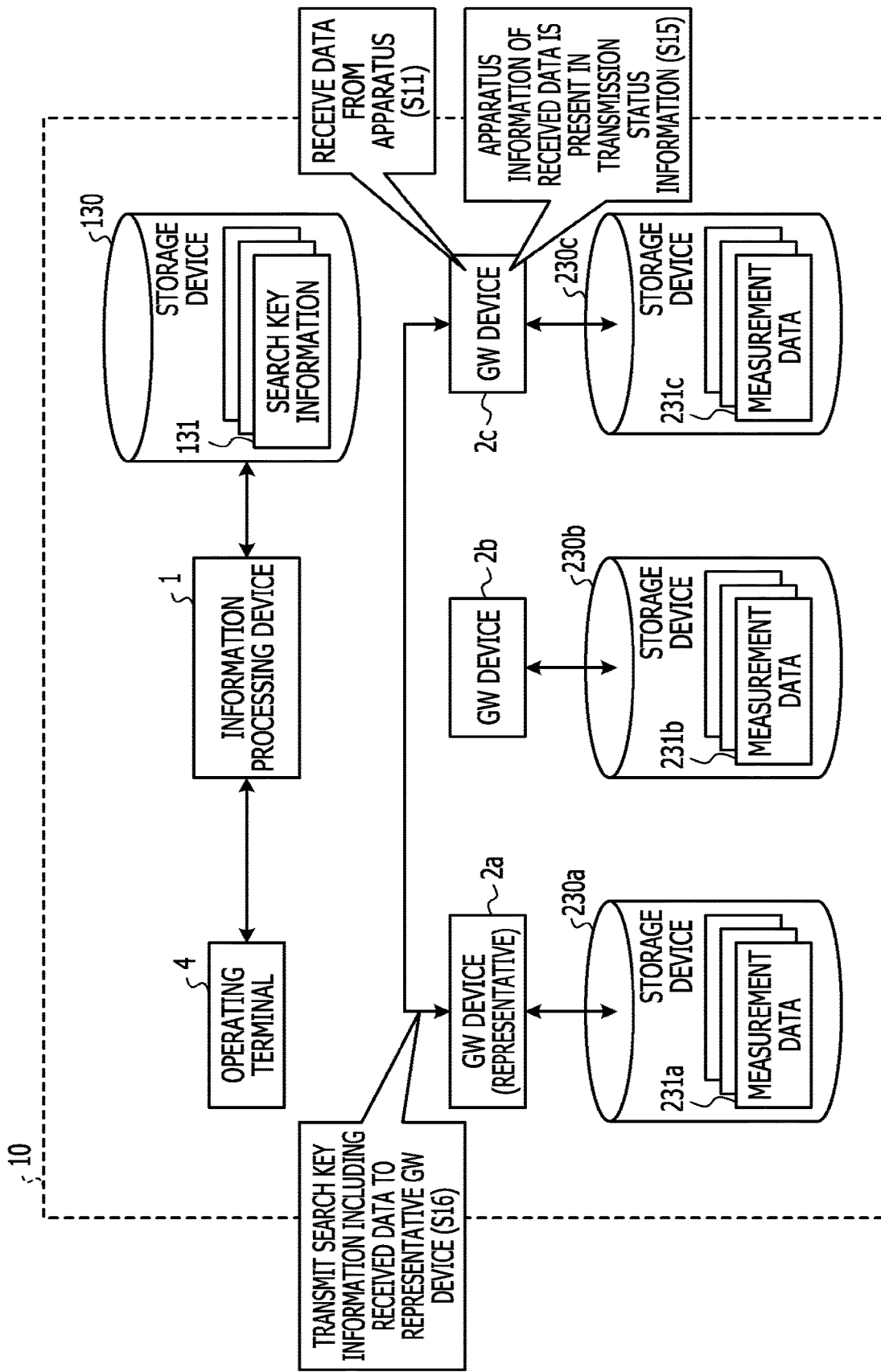
FIG. 22 is a flowchart illustrating the information collection processing in First embodiment in detail.

As a result, when the apparatus information 131b is included in the transmission status information 234 (YES in S15), as illustrated in FIG. 22, the information transmission unit 212 transmits the search key information 131 received in the processing in S11 to the representative gateway device 2 corresponding to the gateway device concerned (S16).

Figure 23:
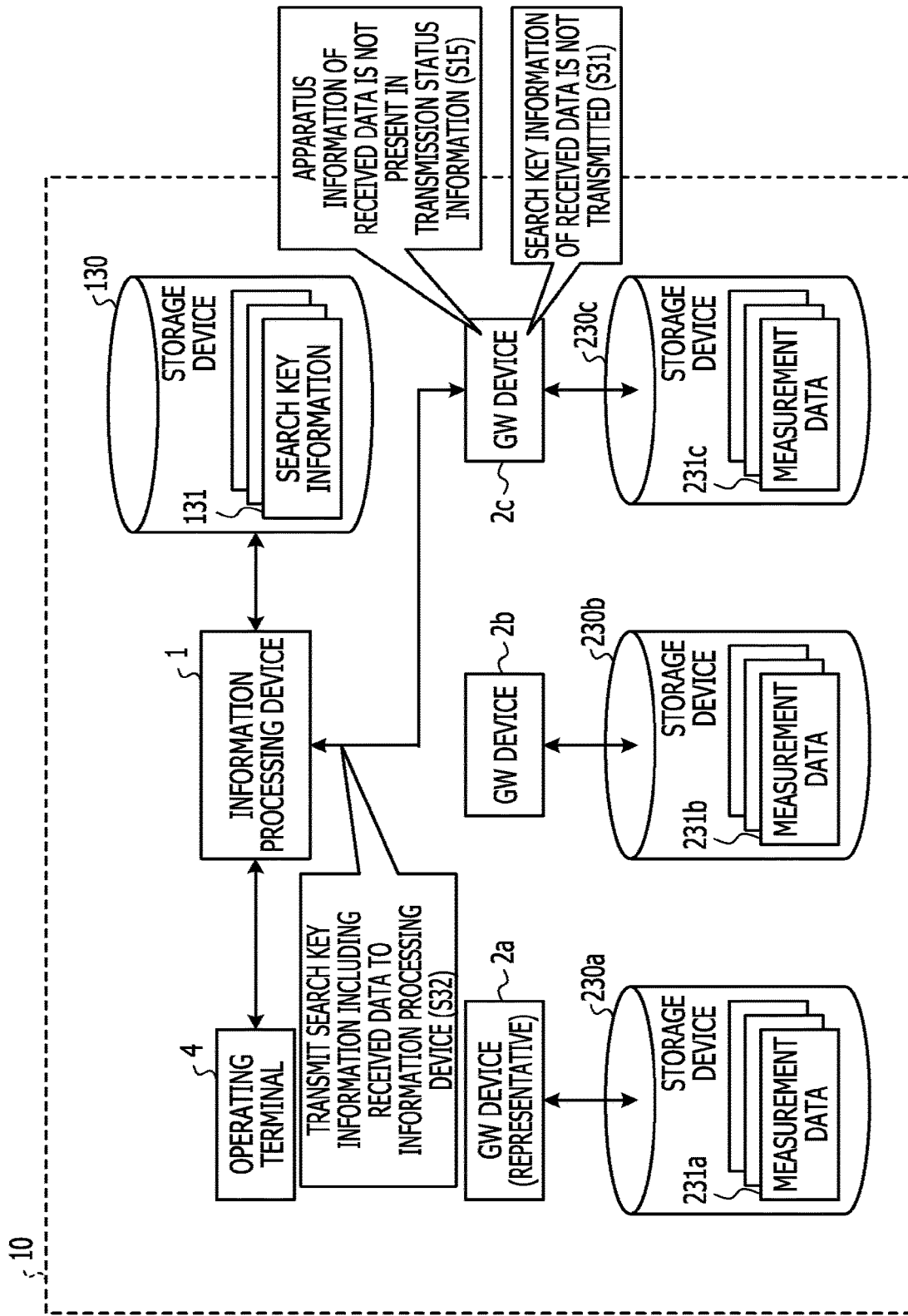
FIG. 23 is a flowchart illustrating the information collection processing in First embodiment in detail.

On the contrary, when the apparatus information 131b of the measurement data 231 received in the processing in S11 is not present in the transmission status information 234 (NO in S15), as illustrated in FIG. 23, the information transmission unit 212 determines whether or not the identification information 131a of the measurement data 231 received in the processing in S11 is included in the integration target information 232 (S31). That is, the information transmission unit 212 determines whether or not the search key information 131 corresponding to the measurement data 231 transmitted from the apparatus 3 has been transmitted to the information processing device 1.

As a result, when it is determined that the identification information 131a of the measurement data 231 is not included in the integration target information 232 (NO in S31), the information transmission unit 212 transmits the search key information 131 to the information processing device 1 (S32). Specifically, in this case, the information transmission unit 212 transmits the search key information 131, which includes the identification information 131a indicating plural pieces of measurement data 231 including the measurement data 231 received in the processing in S11, and the apparatus information 131b corresponding to the apparatus that has transmitted the measurement data 231 received in the processing in S11, to the information processing device 1.

Then, the information management unit 214 adds the identification information 131a included in the search key information 131 transmitted to the information processing device 1 in the processing in S32 to the integration target information 232 stored in the information storage area 230 (S33).

Thereby, when the identification information 131a of the measurement data 231 newly received from the apparatus 3 is included in the search key information 131 that has been transmitted to the information processing device 1, the gateway device 2 may omit transmission of the newly received measurement data 231. Therefore, the gateway device 2 may reduce the frequency of transmitting the search key information 131 to the information processing device 1.

When it is determined that the identification information 131a of the measurement data 231 received in the processing in S11 is included in the integration target information 232 (YES in S31), the information transmission unit 212 and the information management unit 214 do not execute the processing in S32 and S33.

Figure 13:
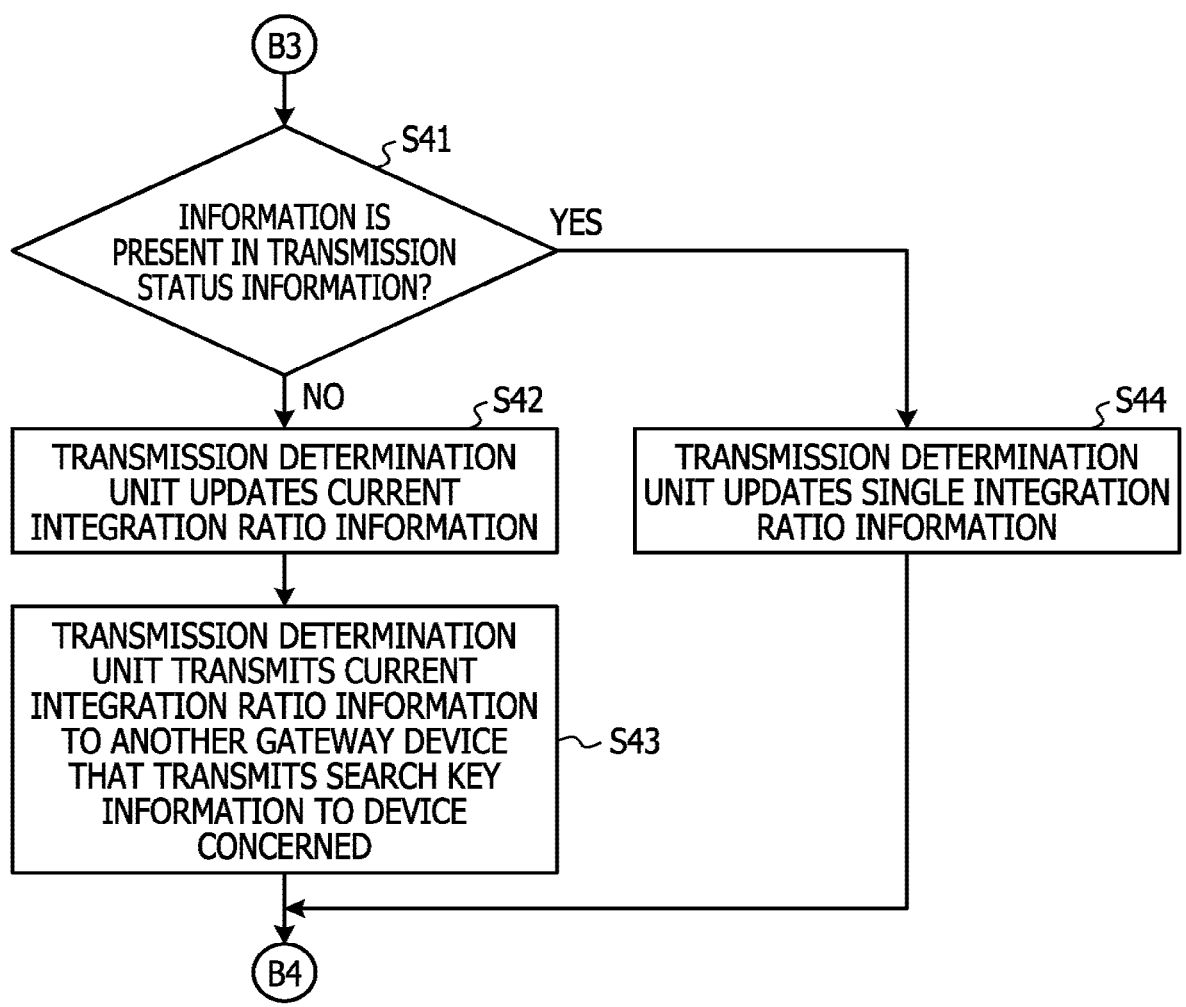
FIG. 13 is a flowchart illustrating the information collection processing in First embodiment in detail.

Following the processing in S16, the processing in S24, or the processing in S33, as illustrated in FIG. 13, the transmission determination unit 213 of the gateway device 2 determines whether or not information is present in the transmission status information 234 (S41). That is, the gateway device 2, information of which is present in the transmission status information 234, is the gateway device 2 that transmits the search key information 131 to the representative gateway device 2. Accordingly, the transmission determination unit 213 refers to the transmission status information 234 to determine whether or not the gateway device concerned is the representative gateway device 2.

As a result, when the information is not present in the transmission status information 234, that is, the gateway device concerned is the representative gateway device 2 (NO in S41), the transmission determination unit 213 updates the current integration ratio information 235 stored in the information storage area 230 (S42). The transmission determination unit 213 transmits the updated current integration ratio information 235 to another gateway device 2 that transmits the search key information 131 to the gateway device concerned (S43). Then, another gateway device 2 that receives the current integration ratio information 235 stores the received current integration ratio information 235 in the information storage area 230.

On the contrary, when the information is present in the transmission status information 234, that is, the gateway device concerned is the representative gateway device 2 (YES in S41), the transmission determination unit 213 updates the single integration ratio information 236 stored in the information storage area 230 (S43).

In this manner, as described later, the transmission determination unit 213 may determine whether or not to continue to transmit the search key information 131 to the representative gateway device 2. A specific example of the information collection processing will be described below.

[Specific Examples of Information Collection Processing]

First, specific examples of the search key information 131 will be described. FIGS. 26A to 26C, 29A and 29B, and 30 are views illustrating specific examples of the search key information 131. Specifically, FIGS. 26A and 29A are views illustrating specific examples of the search key information 131 stored in the information storage area 230c of the gateway device 2c. FIGS. 26B and 29B are views illustrating specific examples of the search key information 131 stored in the information storage area 230a of the gateway device 2a. FIGS. 26C, 29C, and 30 are views illustrating specific examples of the search key information 131 (the search key information 131 transmitted from the gateway device 2a or the gateway device 2c) stored in the information storage area 130 of the information processing device 1.

The search key information 131 in FIGS. 26A to 26C has "Information ID" for identifying information included in the search key information 131, "Apparatus Information" in which the apparatus information 131b is set, and "Identification Information" in which the identification information 131a is set, as items. The search key information 131 in FIGS. 26A to 26C further has "Gateway Information" in which the gateway device 2 that transmits the search key information 131 is set as an item. Information indicating the position where the search key information 131 is stored in each gateway device 2 is set as "Identification Information". Information indicating the gateway device 2 that generates the search key information 131 is set as "Gateway Information".

Specifically, in the search key information 131 in FIG. 26A having "Information ID" of "1", "Device B" is set as "Apparatus Information", "hoge/piyo" is set as "Identification Information", and "2c (gateway device 2c)" is set as "Gateway Information". As the search key information 131 having "Information ID" of "2" in FIG. 26B, "Device A" is set as "Apparatus Information", "piyo/fuga" is set as "Identification Information", and "2c " is set as "Gateway Information".

As the search key information 131 having "Information ID" of "1" in FIG. 26B, "Device A" is set as "Apparatus Information", "hoge/hoge" is set as "Identification Information", and "2a (gateway device 2a)" is set as "Gateway Information". As the search key information 131 having "Information ID" of "2" in FIG. 26B, "Device A" is set as "Apparatus Information", "hoge/fuga" is set as "Identification Information", and "2a " is set as "Gateway Information". As the search key information 131 having "Information ID" of "3" in FIG. 26B, "Device A" is set as "Apparatus Information", "piyo/fuga" is set as "Identification Information", and "2c " is set as "Gateway Information".

Here, in the search key information 131 having "Information ID" of "3" in FIG. 26B, "2c " is set as "Gateway Information". That represents that the search key information 131 having "Information ID" of "3" is the search key information 131 transmitted from the gateway device 2c as another gateway device 2.

Further, in the search key information 131 having "Information ID" of "1" in FIG. 26C, "Device A" is set as "Apparatus Information", "hoge/*" is set as "Identification Information", and "2a " is set as "Gateway Information". As the search key information 131 having "Information ID" of "2" in FIG. 26C, "Device B" is set as "Apparatus Information", "hoge/*" is set as "Identification Information", and "2c " is set as "Gateway Information". As search key information 131 having "Information ID" of "3" in FIG. 26C, "Device A" is set as "Apparatus Information", "piyo/*" is set as "Identification Information", and "2a" is set as "Gateway Information".

That is, for example, the search key information 131 having "Information ID" of "2" in FIG. 26C is generated on the search key information having "Information ID" of "1" in FIG. 26A in the gateway device 2c. Thus, "hoge/*" set as "Identification Information" in the search key information 131 having "Information ID" of "2" in FIG. 26C includes "hoge/piyo" set as "Identification Information" in the search key information 131 having "Information ID" of "1" in FIG. 26A.

For example, the search key information 131 having "Information ID" of "3" in FIG. 26C is generated based on the search key information having "Information ID" of "3" in FIG. 26B in the gateway device 2a. Thus, "piyo/*" set as "Identification Information" in the search key information 131 having "Information ID" of "3" in FIG. 26C includes "piyo/fuga" set as "Identification Information" in the search key information 131 having "Information ID" of "3" in FIG. 26B.

Next, a specific example of the integration target information 232 will be described. FIGS. 27A and 27B are views illustrating a specific example of the integration target information 232. Specifically, FIG. 27A is a view illustrating a specific example of the integration target information 232 stored in the information storage area 230c of the gateway device 2c. FIG. 27B is a view illustrating a specific example of the integration target information 232 stored in the information storage area 230a of the gateway device 2a.

The integration target information 232 in FIGS. 27A and 27B has "Information ID" for identifying information included in the integration target information 232, "Apparatus Information" in which the apparatus information 131b is set, "Identification Information" in which the identification information 131a is set, as items.

Specifically, in the integration target information 232 having "Information ID" of "1" in FIG. 27A, "Device B" is set as "Apparatus Information", and "hoge/*" is set as "Identification Information". That is, that is, the same information as information set as "Information ID", "Apparatus Information", and "Identification Information" in the search key information 131 in FIG. 26C in which "2c" is set as "Gateway Information" is set in the integration target information 232 in FIG. 27A.

In the integration target information 232 having "Information ID" of "1" in FIG. 27B, "Device A" is set as "Apparatus Information", and "hoge/*" is set as "Identification Information". Further, in the integration target information 232 having "Information ID" of "2" in FIG. 27B, "Device A" is set as "Apparatus Information", and "piyo/*" is set as "Identification Information". That is, that is, the same information as information set as "Information ID", "Apparatus Information", and "Identification Information" in the search key information 131 in FIG. 26C in which "2a" is set as "Gateway Information" is set in the integration target information 232 in FIG. 27B.

Subsequently, specific examples of the transmission status information 234 will be described below. FIGS. 28A to 28C are views illustrating of specific examples of the transmission status information 234, the current integration ratio information 235, and the single integration ratio information 236. Specifically, FIG. 28A is a view illustrating a specific example of the transmission status information 234. FIG. 28B is a view illustrating a specific example of the current integration ratio information 235. FIG. 28C is a view illustrating the single integration ratio information 236.

The transmission status information 234 in FIG. 28A has "Information ID" for identifying information included in the transmission status information 234, and "Apparatus Information" in which the apparatus information 131b is set, as items. The transmission status information 234 in FIG. 28A has "Destination" in which the gateway device 2 as a destination of the search key information 131 (representative gateway device 2) is set, as an item.

Specifically, in the transmission status information 234 having "Information ID" of "1" in FIG. 28A, "Device A" is set as "Apparatus Information", and "2a" is set as "Destination".

For example, at receipt of the measurement data 231 from the apparatus 3, when the search key information 131 having "Information ID" of "3" in FIG. 29A is generated (YES in S11, YES in S12, S14), the information transmission unit 212 of the gateway device 2a determines whether or not the apparatus information 131b of the measurement data 231 received in the processing in S11 is included in the transmission status information 234 (S15).

Here, "Device A" set as "Apparatus Information" in the search key information 131 having "Information ID" of "3" in FIG. 29A is set as "Apparatus Information" in the transmission status information 234 having "Information ID" of "1" in FIG. 28A (YES in S15). Thus, the information transmission unit 212 of the gateway device 2a transmits the search key information 131 having "Information ID" of "3" in FIG. 29A to the gateway device 2a indicated by "Destination" in the transmission status information 234 having "Information ID" of "1" in FIG. 28A (S16).

The information reception unit 211 of the gateway device 2a receives the search key information 131 transmitted from the information transmission unit 212 of the gateway device 2c (the search key information 131 having "Information ID" of "3" in FIG. 29A) (YES in S11, NO in S12). Then, as in the search key information 131 having "Information ID" of "4" in FIG. 29B, the information management unit 214 of the gateway device 2a stores the received search key information 131 in the information storage area 230a (S21).

Subsequently, the information transmission unit 212 of the gateway device 2a determines whether or not the identification information 131a of the measurement data 231 corresponding to the search key information 131 stored in the information storage area 230a is present in the integration target information 232 (S22).

Here, "piyo/*" including "piyo/hoge" set as "Identification Information" in the information having "Information ID" of "4" in FIG. 29B is set as "Identification Information" in the integration target information 232 having "Information ID" of "2" in FIG. 27B. Thus, the information transmission unit 212 determines that the identification information 131a of the measurement data 231 corresponding to the search key information 131 stored in the information storage area 230a is present in the integration target information 232 (YES in S22).

Since the gateway device 2a is the representative gateway device 2 (NO in S41), the transmission determination unit 213 of the gateway device 2a updates the current integration ratio information 235 of the gateway device 2a (S42). Specifically, in this case, the transmission determination unit 213 of the gateway device 2a updates current integration ratio information 235 on Device A set as Apparatus Information" in the search key information 131 (the search key information 131 received in the processing in S11) having "Information ID" of "3" in FIG. 29A. Specific examples of the current integration ratio information 235 on Device A will be described below.

FIG. 28B is a view illustrating a specific example of the current integration ratio information 235. The current integration ratio information 235 in FIG. 28B has "Information ID" for identifying information included in the current integration ratio information 235, "Apparatus Information" in which the Apparatus Information 131b is set, and "Integration Ratio" in which the current calculation value is set, as items.

Specifically, in the search key information 131 in FIG. 29B, the number of pieces of information in which "Device A" is set as "Apparatus Information", and which corresponds to the integration target information 232 in FIG. 27B, is four pieces of information having "Information ID" of "1" to "4". In the integration target information 232 in FIG. 27B, the number of pieces of information corresponding to the search key information 131 having "Information ID" of "1" to "4" in FIG. 29B is two pieces of information having "Information ID" of "1" and "2".

Accordingly, the transmission determination unit 213 of the gateway device 2a determines that four pieces of information included in the search key information 131 in FIG. 29B are integrated into two pieces of information included in the integration target information 232 in FIG. 27B. Accordingly, in this case, the transmission determination unit 213 calculates "50(%)" as the current integration ratio information 235 on Device A in the gateway device 2a (NO in S41, S42).

Then, the transmission determination unit 213 of the gateway device 2a transmits the calculated current integration ratio information 235 to the gateway device 2c that has transmitted the search key information 131 to the gateway device 2a (S43).

On the contrary, since the gateway device concerned is not the representative gateway device 2, the transmission determination unit 213 of the gateway device 2c updates the single integration ratio information 236 of the gateway device 2c (YES in S41, S44). Specifically, as in the current integration ratio information 235, the transmission determination unit 213 of the gateway device 2c updates the single integration ratio information 236 on Device A. That is, the transmission determination unit 213 of the gateway device 2c calculates the integration ratio of the search key information 131 in the gateway device 2c in the case of transmitting the search key information 131 to the gateway device 2a. Specific examples of the single integration ratio information 236 on Device A will be described below.

FIG. 28C is a view illustrating a specific example of the single integration ratio information 236. The single integration ratio information 236 in FIG. 28C has "Information ID" for identifying information included in the single integration ratio information 236, "Apparatus Information" in which the Apparatus Information 131b is set, and "integration ratio" in which the current calculation value is set, as items.

Specifically, in the search key information 131 in FIG. 29A, the number of pieces of information in which "Device A" is set as "Apparatus Information", and which corresponds to the integration target information 232 in FIG. 27B (the integration target information 232 of the gateway device 2a as the representative gateway device 2), is two pieces of information having "Information ID" of "2" and "3". In the integration target information 232 in FIG. 27B, the number of pieces of information corresponding to the search key information 131 having "Information ID" of "2" and "3" in FIG. 29A is one piece of information having "Information ID" of "2".

Accordingly, the transmission determination unit 213 of the gateway device 2c determines that two pieces of information included in the search key information 131 in FIG. 29A are integrated into one piece of information included in the integration target information 232 in FIG. 27B. Accordingly, in this case, the transmission determination unit 213 calculates "50(%)" as the current integration ratio information 235 on Device A in the gateway device 2*a* (S44).

In the above example, the information transmission unit 212 of the gateway device 2*c* does not transmit new search key information 131 to the information processing device 1 (S23, S32). Thus, as illustrated in FIG. 29C, the search key information 131 stored in the information storage area 130 of the information processing device 1 is not updated from the state illustrated in FIG. 26C.

[Information Collection Processing of Information Processing Device]

Figure 14:
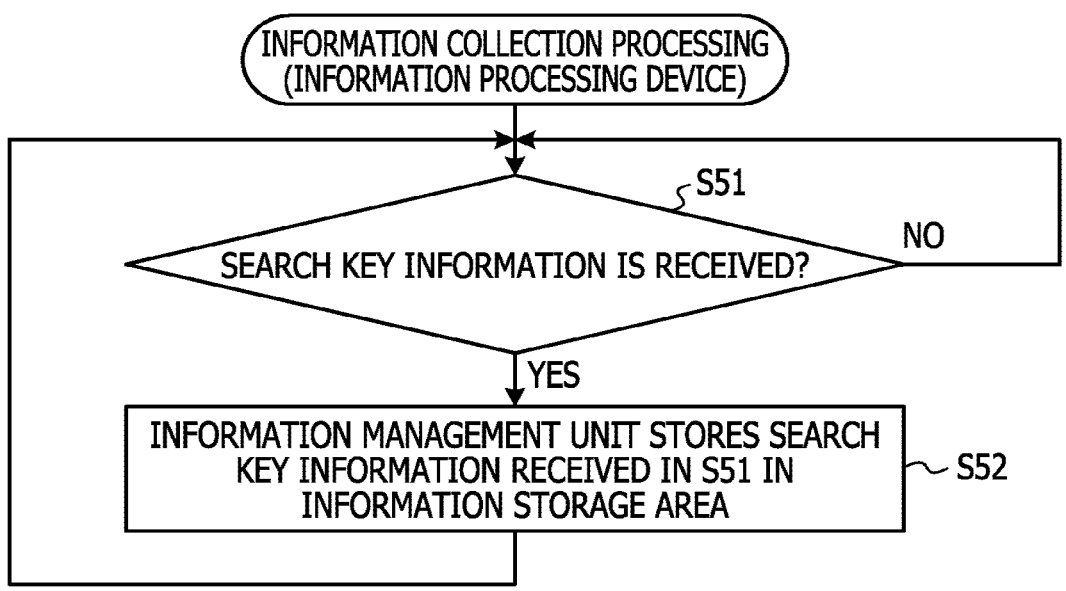
FIG. 14 is a flowchart illustrating the information collection processing in First embodiment in detail.

Next, information collection processing of the information processing device 1 will be described. As illustrated in FIG. 14, the information management unit 116 of the information processing device 1 waits until it receives the search key information 131 from the gateway device 2 (NO in S51). The information management unit 116 stores the search key information 131 received in the processing in S51, in the information storage area 130.

In this manner, at receipt of a search request from the user, the information processing device 1 may identify the gateway device 2 that stores the measurement data 231 corresponding to the search request. Therefore, the information processing device 1 may acquire the measurement data 231 corresponding to the search request.

[Integration Setting Processing of Information Processing Device]

Next, of the information collection processing, the processing of instructing setting for integration of the search key information 131 from the information processing device 1 to each gateway device 2 (hereinafter referred to as integration setting processing) will be described. First, the integration setting processing of the information processing device 1 will be described.

Figure 15:
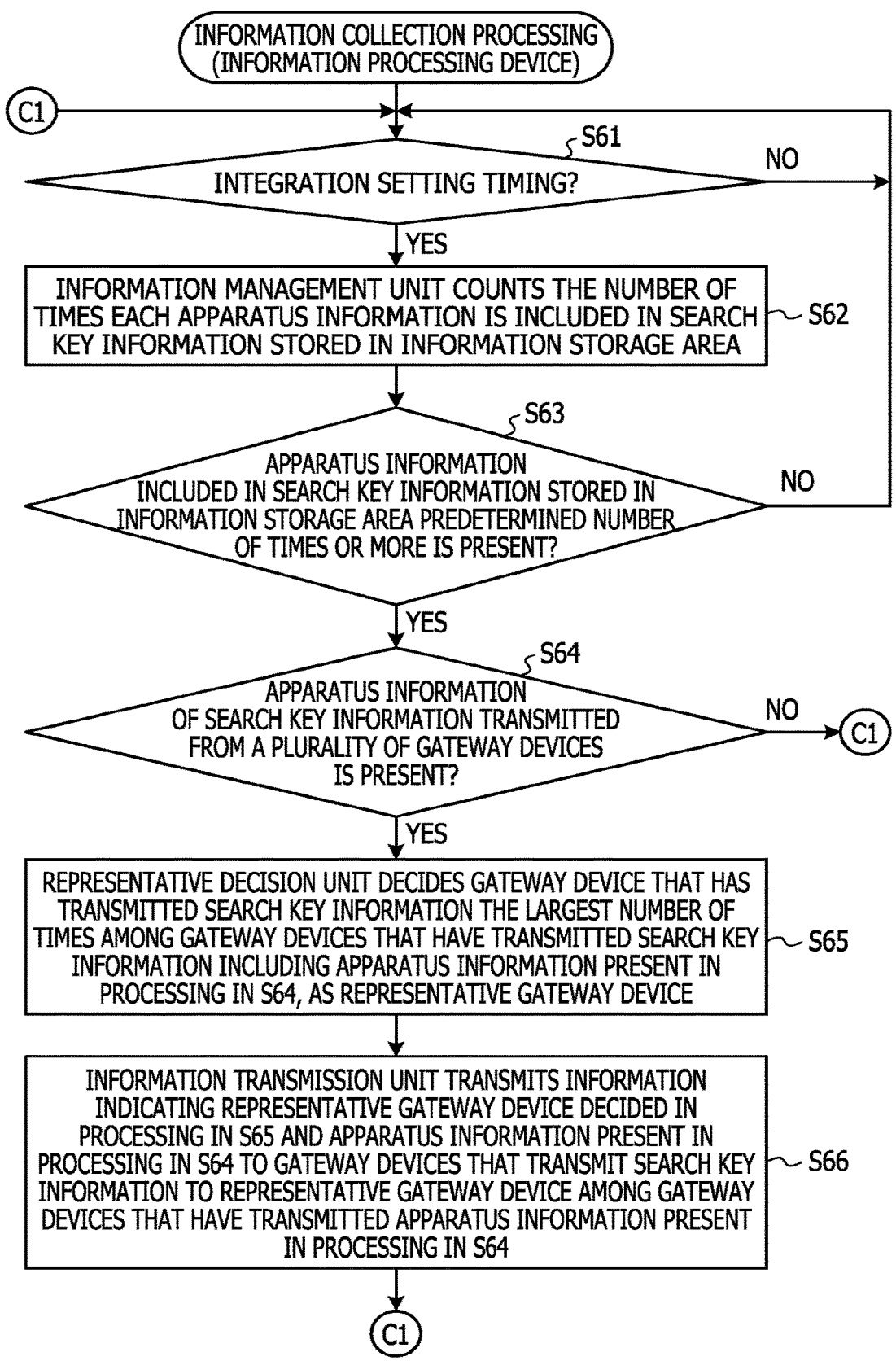
FIG. 15 is a flowchart illustrating the information collection processing in First embodiment in detail.

As illustrated in FIG. 15, the apparatus identification unit 112 of the information processing device 1 waits until an integration setting timing comes (S61). The integration setting timing may be periodical (every one minute). When the integration setting timing comes (YES in S61), the apparatus identification unit 112 counts the number of times the apparatus information 131*b* is included in the search key information 131 stored in the information storage area 130 (S62). As a result, the apparatus identification unit 112 determines whether or not the apparatus information 131*b* included in the search key information 131 stored in the information storage area 130 a predetermined number of times is present (S63). When the apparatus information 131*b* included the predetermined number of times is present (YES in S63), the apparatus identification unit 112 determines whether or not the apparatus information 131*b* of the search key information 131 transmitted from a plurality of gateway devices 2 is present (S64).

Figure 24:
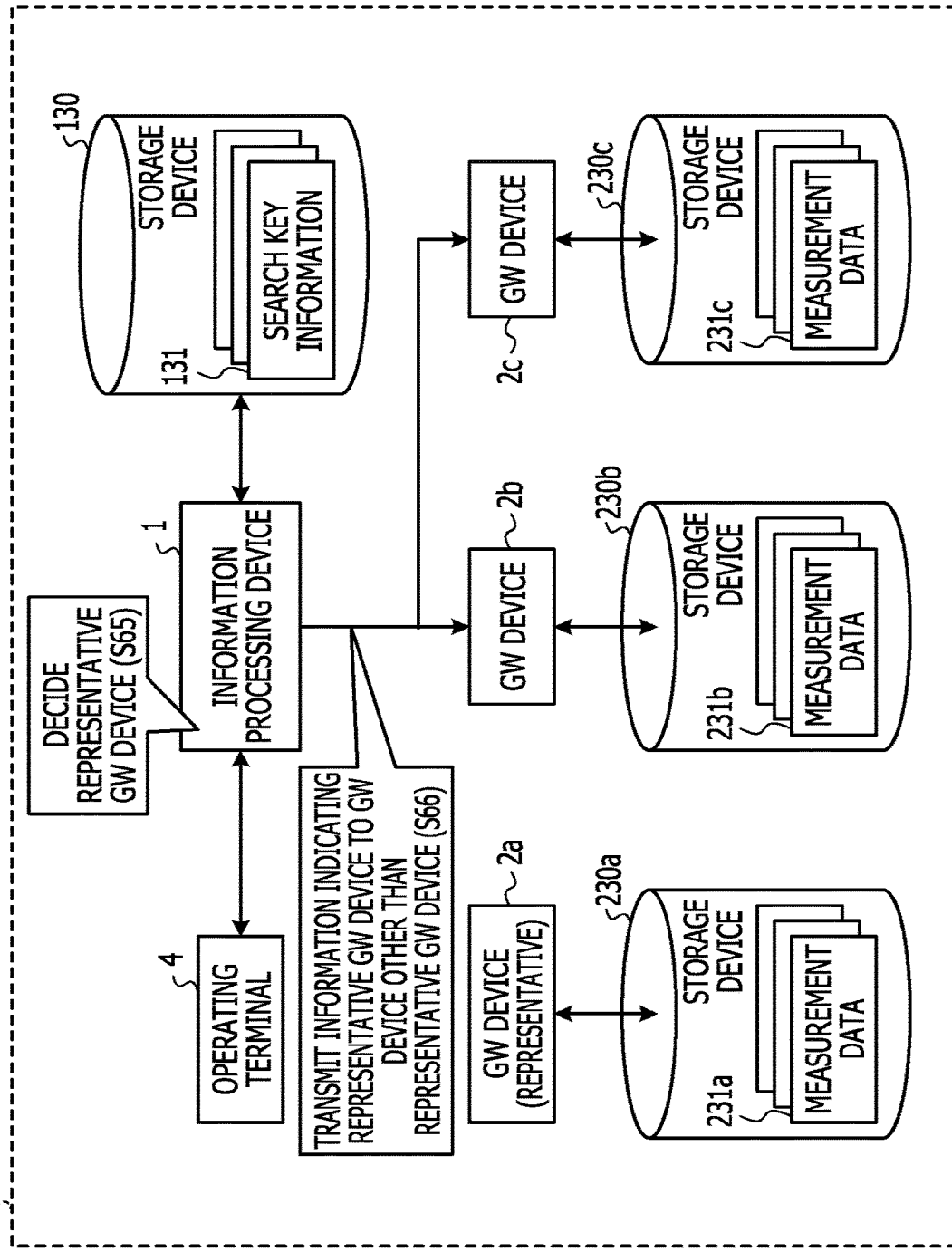
FIG. 24 is a flowchart illustrating the information collection processing in First embodiment in detail.

When it is determined that the apparatus information 131*b* of the search key information 131 transmitted from the plurality of gateway devices 2 is present (YES in S64), as illustrated in FIG. 24, the representative decision unit 113 decides the gateway device 2 that has transmitted the search key information 131 the largest number of times among the gateway devices 2 that have transmitted the search key information 131 including the apparatus information present in the processing in S64, as the representative gateway device 2 (S65). Then, as illustrated in FIG. 24, the information transmission unit 114 transmits information indicating the representative gateway device 2 decided in the processing in S65 and the apparatus information 131*b* present in the processing in S64 to the gateway devices 2 that transmit the search key information 131 to the representative gateway device 2 among the gateway devices 2 that have transmitted the apparatus information 131*b* present in the processing in S64 (S66).

That is, to suppress an increase in communication traffic due to transmission/receipt of the search key information 131 between the gateway devices 2, the gateway device 2 capable of reducing the transmission/receipt of the search key information 131 between the gateway devices 2 is preferably decided as the representative gateway device 2.

Thus, the information processing device 1 refers to the search key information 131 transmitted from each gateway device 2 to identify the apparatus information 131*b* included in the search key information 131 a predetermined number of times, and in the search key information 131 transmitted from a plurality of gateway devices 2. The information processing device 1 decides the gateway device 2 that has transmitted the search key information 131 to the information processing device 1 the largest number of times among the gateway devices 2 that has transmitted the search key information 131 including the identified apparatus information 131*b*, as the representative gateway device 2. Thereby, the information processing device 1 may identify the representative gateway device 2 capable of reducing communication traffic of the information processing system 10 as a whole, and the search key information 131 to be integrated into the representative gateway device 2.

When the apparatus information 131*b* included in the search key information 131 stored in the information storage area 130 the predetermined number of times is not present (NO in S63), the apparatus identification unit 112 executes the processing in S61 and subsequent steps again. Similarly, when the apparatus information 131*b* transmitted from a plurality of gateway devices 2 is not present (NO in S64), or after the processing in S66, the apparatus identification unit 112 executes the processing in S61 and subsequent steps again. Specific examples of the processing in S63 to S65 will be described below.

[Specific Examples of Processing in S63 to S65]

FIG. 30 is a view illustrating specific examples of the processing in S63 to S65. Specifically, in the search key information 131 having "Information ID" of "1", "3", "4 ", and "5" in FIG. 30, "Device A" is set in "Apparatus Information". In the search key information 131 having "Information ID" of "1", "3", and "4" in FIG. 30, "2*a*" is set in "Gateway Information", and in the search key information 131 having "Information ID" of "5", "2*c*" is set as "Gateway Information".

Thus, in this case, when the predetermined number of times in the processing in S63 includes "3 (times)", the apparatus identification unit 112 identifies "Device A" as the apparatus information 131*b* to be transmitted to the gateway device 2. In this case, the representative decision unit 113 decides the gateway device 2*a* as the gateway device 2 set in "Gateway Information" the largest number of times in the search key information 131 in FIG. 30 in which "Device A" is set as "Apparatus Information", as the representative gateway device 2.

[Integration Setting Processing of Gateway Device]

Figure 16:
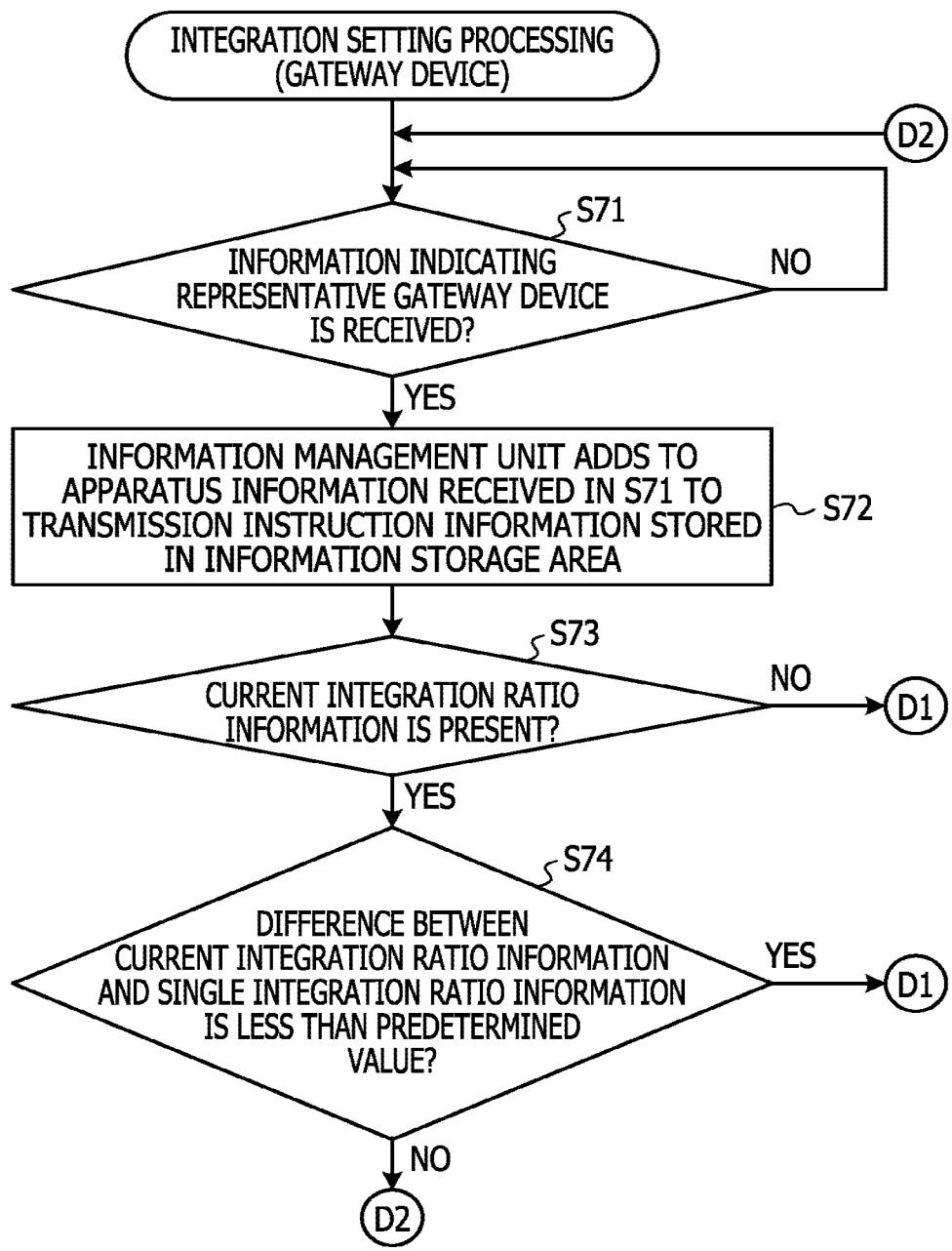
FIG. 16 is a flowchart illustrating the information collection processing in First embodiment in detail.

Next, integration setting processing of the gateway device 2 will be described. As illustrated in FIG. 16, the information reception unit 211 waits until it receives information indicating the representative gateway device 2 decided in the processing in S65, and the apparatus information 131*b* that is present in the processing in S64 from the information processing device 1 (NO in S71).

When the information reception unit 211 receives the information indicating the representative gateway device 2 and the apparatus information (YES in S71), the information management unit 214 adds the apparatus information 131b received in the processing in S71 to the transmission instruction information 233 stored in the information storage area 230 (S72). The transmission instruction information 233 includes the apparatus information 131b corresponding to the measurement data 231 integrated into the representative gateway device 2 and information indicating the representative gateway device 2, and is decided by the integration setting processing in the information processing device 1. Specific examples of the transmission instruction information 233 will be described below.

[Transmission Instruction Information and Specific Examples of Transmission Instruction Information]

FIGS. 31A and 31B are views illustrating the transmission instruction information 233 and specific examples of the transmission status information 234. FIG. 31A is a view illustrating a specific example of the transmission instruction information 233. FIG. 31B is a view illustrating a specific example of the transmission status information 234. The transmission instruction information 233 in FIG. 31A has the same items as the transmission status information 234 in FIG. 28A.

Specifically, in processing in S71, when receiving information indicating that the gateway device 2b is the representative gateway device 2, as illustrated in FIG. 31A, the information management unit 214 sets "2b38 to "destination". In the processing in S71, when receiving information indicating that the search key information 131 having the apparatus information 131b as "Device A" and "Device C" is transmitted, the information management unit 214 sets "Device A" and "Device C" in "Apparatus Information" with "Information ID" of "1" and "2", respectively.

Returning to FIG. 16, the transmission determination unit 213 determines whether or not the current integration ratio information 235 is stored in the information storage area 230, that is, the current integration ratio information 235 has been transmitted from the information processing device 1 (S73). As a result, when it is determined that the current integration ratio information 235 is stored in the information storage area 230 (YES in S73), the transmission determination unit 213 determines whether or not the difference between the current integration ratio information 235 and the single integration ratio information 236 corresponding to the apparatus information 131b received in the processing in S71 is less than a predetermined value (S74). Details of the processing in S74 will be described below.

[Details of Processing in S74]

In the example illustrated in FIG. 2, when the gateway device 2a and the gateway device 2c do not integrate the search key information 131, communication traffic between information processing device 1 and each gateway device 2, which is caused by transmission/receipt of the search key information 131 having the apparatus information 131b of "Device A" is expressed by a following formula (1). It is assumed that the gateway device 2b does not transmit/receive the search key information 131 to/from the information processing device 1 and another gateway device 2. In the formula (1), $P_{aA}$ indicates the single integration ratio information 236 of the gateway device 2a in the search key information 131 having the apparatus information 131b of "Device A". PcA indicates the single integration ratio information 236 of the gateway device 2c in the search key information 131 having the apparatus information 131b of "Device A". $Q_{aA}$ indicates the number of pieces of the measurement data 231 transmitted from the apparatus having the apparatus information 131b of "Device A" to the gateway device 2a. Further, $Q_{cA}$ indicates the number of pieces of the measurement data 231 transmitted from the apparatus having the apparatus information 131b of "Device A" to the gateway device 2c.

$$(1-P_{aA})Q_{aA}+(1-P_{cA})Q_{cA} \tag{1}$$

When the gateway device 2a and the gateway device 2c integrate the search key information 131, communication traffic between the information processing device 1 and each gateway device 2, which is caused by transmission/receipt of the search key information 131 corresponding to the measurement data 231 transmitted from "Device A" is expressed by a following formula (2). The formula (2) indicates communication traffic given that the gateway device 2a is the representative gateway device 2, and the gateway device 2c is the gateway device 2 that transmits the search key information 131 to the representative gateway device 2. In the formula (2), $P_{acA}$ indicates the current integration ratio information 235 of the gateway device 2c in the search key information 131 having the apparatus information 131b of "Device A".

$$(1-P_{acA})(Q_{aA}+Q_{cA}) \tag{2}$$

Further, a formula acquired by subtracting the formula (2) from the formula (1) is expressed by a following formula (3).

$$(P_{acA}-P_{aA})Q_{aA}+(P_{acA}-P_{cA})Q_{cA} \tag{3}$$

That is, formula (3) represents that a decrease in communication traffic between the information processing device 1 and each gateway device 2 due to integration of the search key information 131 becomes smaller, as the difference between the current integration ratio information 235 in the gateway device 2c and the single integration ratio information 236 in the gateway device 2a comes closer to 0. Similarly, formula (3) represents that a decrease in communication traffic between the information processing device 1 and each gateway device 2 due to integration of the search key information 131 becomes smaller, as the difference between the current integration ratio information 235 in the gateway device 2c and the single integration ratio information 236 in the gateway device 2c comes closer to 0.

For this reason, when the difference between the current integration ratio information 235 in the representative gateway device 2 and the single integration ratio information 236 in the gateway device concerned comes close to 0, the transmission determination unit 213 of the gateway device 2 that transmits the search key information 131 to the representative gateway device 2 may determine to stop integration of the search key information 131. Thus, for example, the transmission determination unit 213 determines whether or not the difference between the current integration ratio information 235 and the single integration ratio information 236 corresponding to the apparatus information 131b received in the processing in S71 is less than the predetermined value (S74). When the difference between the current integration ratio information 235 and the single integration ratio information 236 is the predetermined value, the transmission determination unit 213 of the gateway device 2a determines that the effect of integration of the search key information 131 is small, and decides not to transmit the search key information 131 including the apparatus information 131b received in the processing in S71 to the representative gateway device 2.

Returning to FIG. 16, when it is determined that the difference between the current integration ratio information 235 and the single integration ratio information 236 is less than the predetermined value (YES in S74), the information management unit 214 executes the processing in S71 and subsequent steps. That is, in the case, the transmission determination unit 213 decides not to transmit the search key information 131 including the apparatus information 131b received in the processing in S71 to the representative gateway device 2.

Figure 17:
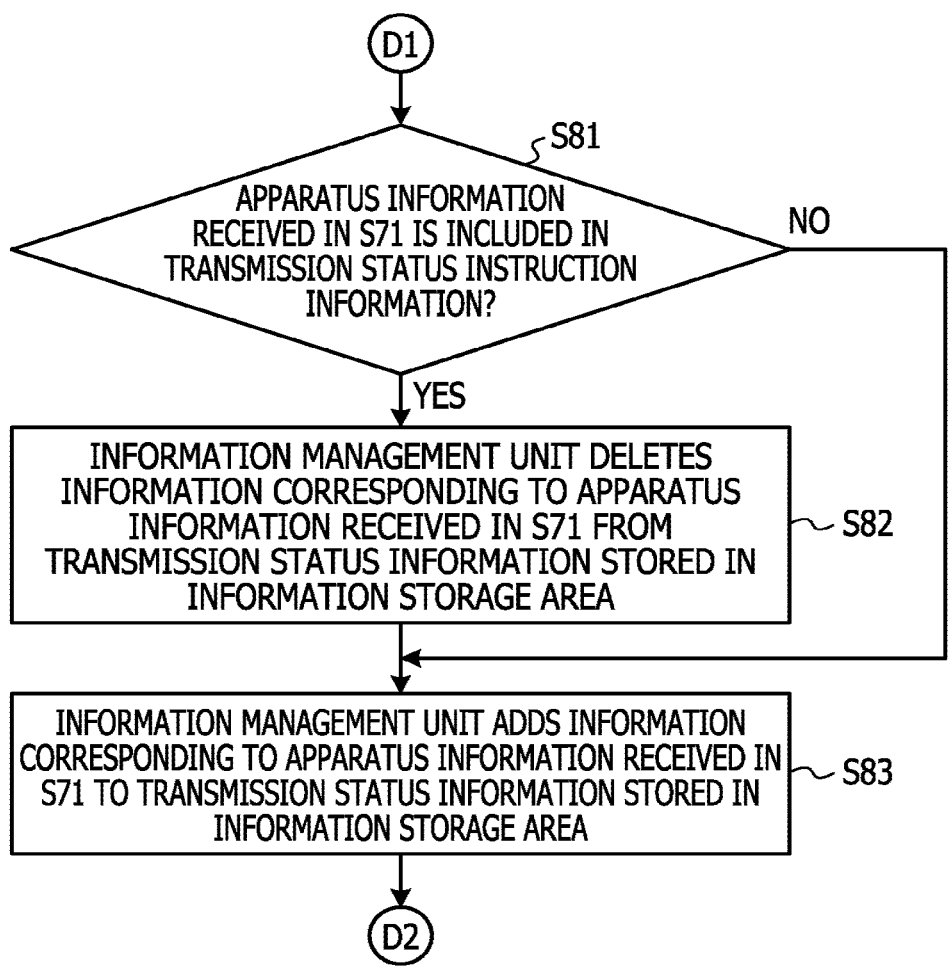
FIG. 17 is a flowchart illustrating the information collection processing in First embodiment in detail.

When it is determined that difference between the current integration ratio information 235 and the single integration ratio information 236 is not less than the predetermined value (NO in S74), as illustrated in FIG. 17, the information management unit 214 determines whether or not the apparatus information 131b received in the processing in S71 is included in the transmission status information 234 (S81). When the apparatus information 131b received in the processing in S71 is included in the transmission status information 234 (YES in S81), the information management unit 214 deletes information corresponding to the apparatus information 131b received in the processing in S71 from the transmission status information 234 stored in the information storage area 230 (S82). On the contrary, when the apparatus information 131b received in the processing in S71 is not included in the transmission status information 234 (NO in S81), the information management unit 214 does not execute the processing in S82.

The information management unit 214 adds information corresponding to the apparatus information 131b received in the processing in S71 to the transmission status information 234 stored in the information storage area 230 (S83). Then, the information management unit 214 executes the processing in S71 and subsequent steps again. A specific example in the case of applying the processing in S82 and S83 to the transmission status information 234 in FIG. 28A will be described below.

[Specific Example of Transmission Instruction Information in Processing in S82 and S32]

FIG. 31B is a view illustrating a specific example of the transmission instruction information 233 in the case of executing processing in S82 and S32. "Device A" and "Device C" are set as the transmission instruction information 233 in FIG. 31A. In the transmission status information 234 having "Information ID" of "1" in FIG. 28A, "Device A" is set as "Apparatus Information".

Thus, the information management unit 214 deletes information having "Information ID" of "1" from the transmission status information 234 in FIG. 28A (S82). Thereby, information management unit 214 may initialize the transmission status information 234 in FIG. 28A in which "Device A" is set as "Apparatus Information". The information management unit 214 adds information included in the transmission instruction information 233 in FIG. 31A (information having "Information ID" of "1" and "2") to the transmission status information 234 from which information having "Information ID" of "1" is deleted (S83).

That is, the transmission instruction information 233 is updated to reflect contents of the information received in the processing in S71. Thus, the transmission instruction information 233 is not updated unless information is received in the processing in S71. On the contrary, the transmission status information 234 is updated when information is received in the processing in S71 and as described later, when the gateway device 2 that transmits the search key information 131 to the representative gateway device 2 spontaneously determines.

[Integration Cancellation Processing]

Next, of the information collection processing, processing of spontaneously cancelling setting for integration of the search key information 131 by each gateway device 2 (hereinafter referred to as integration cancellation processing) will be described.

Figure 18:
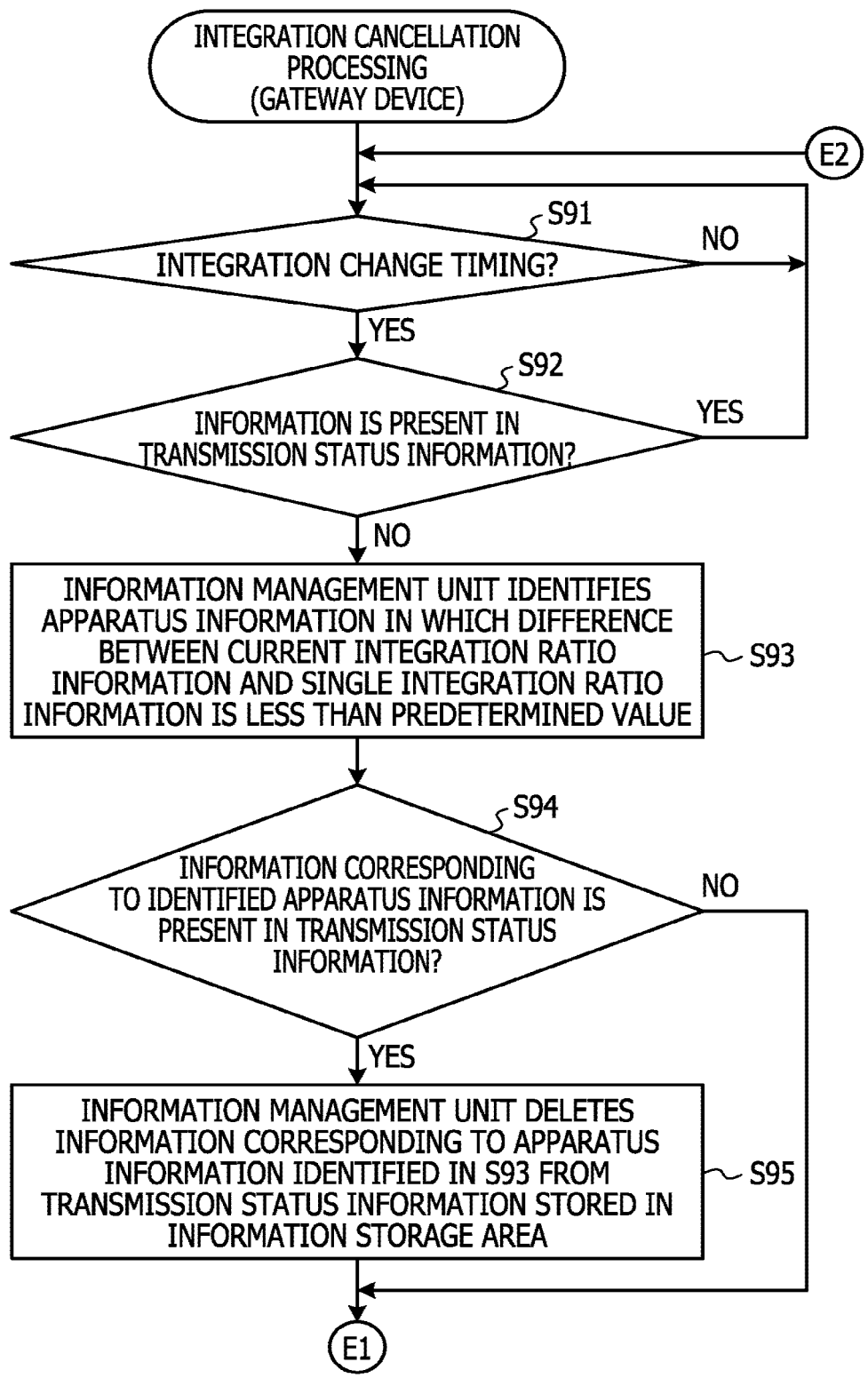
FIG. 18 is a flowchart illustrating the information collection processing in First embodiment in detail.

As illustrated in FIG. 18, the information management unit 214 waits until an integration cancellation timing comes (S91). The integration cancellation timing may be periodical (every one minute). When the integration cancellation timing comes (YES in S91), the information management unit 214 determines whether or not information is present in the transmission status information 234, that is, the gateway device concerned is the representative gateway device 2 (S92).

Figure 25:
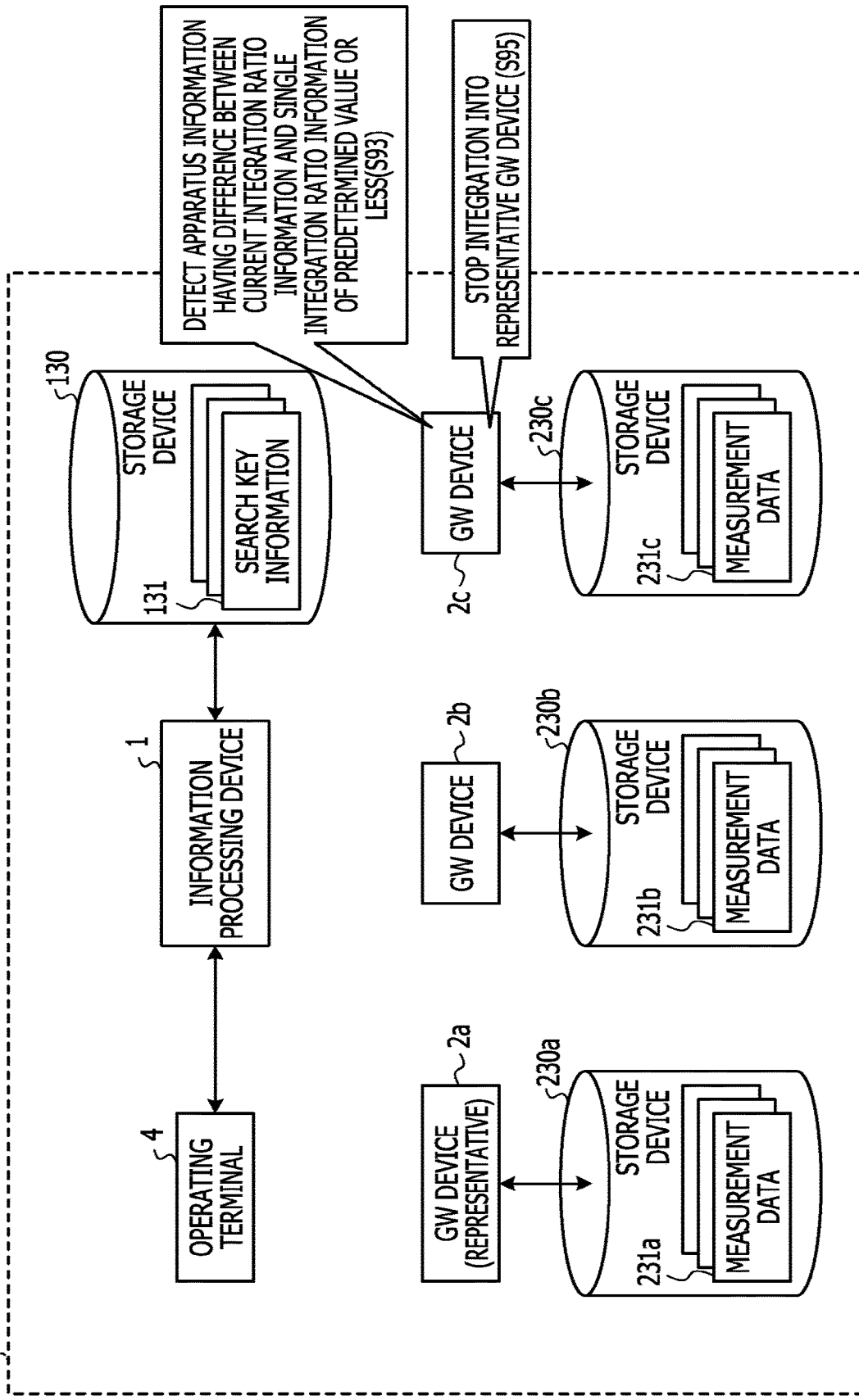
FIG. 25 is a flowchart illustrating the information collection processing in First embodiment in detail.

As a result, when information is not present in the transmission status information 234 (NO in S92), as illustrated in FIG. 25, the information management unit 214 identifies the apparatus information 131b in which the difference between the current integration ratio information 235 and the single integration ratio information 236 becomes less than the predetermined value (S93).

That is, after the apparatus information 131b of the search key information 131 to be integrated is received from the information processing device 1 in the processing in S71, the apparatus information 131b in which the difference between the current integration ratio information 235 and the single integration ratio information 236 becomes less than the predetermined value may occur. Accordingly, in the processing in S93, the information management unit 214 identifies also the newly occurred apparatus information 131b in which the difference between the current integration ratio information 235 and the single integration ratio information 236 becomes less than the predetermined value.

When information corresponding to the apparatus information 131b identified in the processing in S93 is present in the transmission status information 234 (YES in S94), as illustrated in FIG. 25, the information management unit 214 deletes the information corresponding to the apparatus information 131b identified in the processing in S93 from the transmission status information 234 stored in the information storage area 230 (S95). On the contrary, when the information corresponding to the apparatus information 131b identified in the processing in S93 is not present in the transmission status information 234 (NO in S94), the information management unit 214 does not execute the processing in S95.

That is, the apparatus information 131b in which the difference between the current integration ratio information 235 and the single integration ratio information 236 becomes less than the predetermined value newly occurs, the gateway device 2 stops transmission of the search key information 131 including the apparatus information 131b to the representative gateway device 2.

Figure 19:
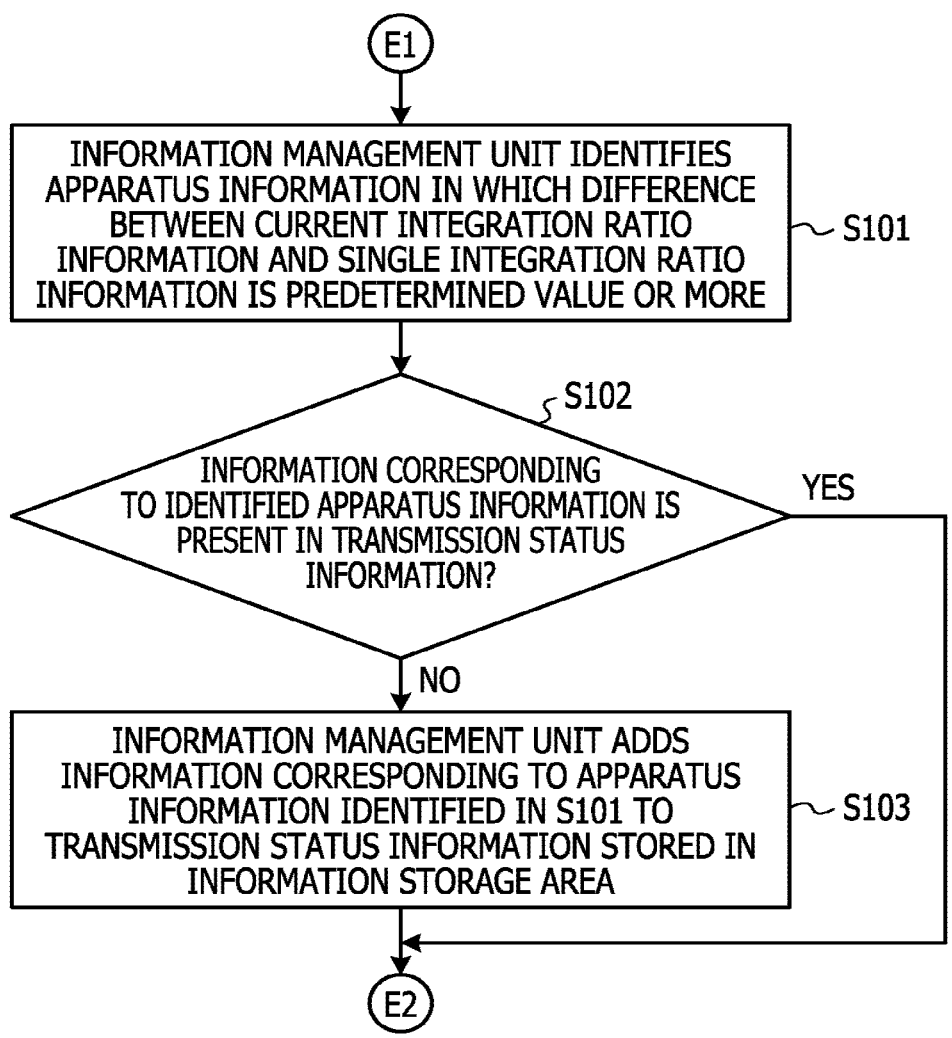
FIG. 19 is a flowchart illustrating the information collection processing in First embodiment in detail.

Then, as illustrated in FIG. 19, the information management unit 214 identifies the apparatus information 131b in which the difference between the current integration ratio information 235 and the single integration ratio information 236 is the predetermined value or more (S101). That is, after the apparatus information 131b of the search key information 131 to be integrated is received from the information processing device 1 in the processing in S71, the apparatus information 131b in which the difference between the current integration ratio information 235 and the single integration ratio information 236 decreases to a value less than the predetermined value and increases to a value more than the predetermined value may occur. For this reason, in the processing in S101, the information management unit 214 also identifies the apparatus information 131b in which the difference between the current integration ratio information 235 and the single integration ratio information 236 becomes the predetermined value or more again.

When the information corresponding to the apparatus information 131b identified in the processing in S101 is not present in the transmission status information 234 (NO in S102), the information management unit 214 adds the information corresponding to the apparatus information 131b identified in the processing in S101 to the information corresponding to the transmission status information 234 stored in the information storage area 230 (S103). On the contrary, when the information corresponding to the apparatus information 131b identified in the processing in S101 is present in the transmission status information 234 (YES in S102), the information management unit 214 does not execute the processing in S103.

That is, when the apparatus information 131b in which the difference between the current integration ratio information 235 and the single integration ratio information 236 becomes the predetermined value or more newly occur, the gateway device 2 restarts transmission of the search key information 131 including the newly occurred apparatus information 131b to the representative gateway device 2.

Therefore, the gateway device 2 may appropriately change setting for reducing communication traffic of the information processing system 10 as a whole. [0165] In this manner, at receipt of the measurement data 231 corresponding to the search key information 131 to be integrated from each apparatus 3, the gateway device 2 in this embodiment transmits the search key information 131 corresponding to the received measurement data 231 to the representative gateway device 2.

When the gateway device 2 receives the search key information 131 from another gateway device 2, and the received search key information 131 is not included in the search key information 131 that has been transmitted to the information processing device 1, the gateway device 2 transmits the search key information 131 to the information processing device 1. Specifically, in this case, the gateway device 2 transmits the search key information 131 corresponding to plural pieces of measurement data 231 including the measurement data 231 corresponding to the received search key information 131 to the information processing device 1.

Further, at receipt of the measurement data 231 corresponding to the search key information 131 that is not to be integrated from each apparatus 3, when the search key information 131 corresponding to the received measurement data 231 is not included in the search key information 131 that has been transmitted to the information processing device 1, the gateway device 2 transmits the search key information 131 to the information processing device 1. Specifically, in this case, the gateway device 2 transmits the search key information 131 corresponding to plural pieces of measurement data 231 including the received measurement data 231 to the information processing device 1.

When the gateway device concerned is not the representative gateway device 2, the gateway device 2 acquires the first ratio of the number of pieces of search key information 131 transmitted to the information processing device 1 to the sum of the number of pieces of measurement data 231 received from the apparatuses 3 and the number of pieces of search key information 131 received from another gateway devices 2, in the representative gateway device 2. The gateway device 2 acquires the second ratio of the number of pieces of search key information 131 transmitted to the information processing device 1 to the number of pieces of measurement data 231 received from the apparatus 3, in the gateway device concerned in the case where the search key information 131 is not transmitted to the representative gateway device 2. Based on the first ratio and the second ratio, the gateway device 2 determines whether or not to continue to transmit of the search key information 131 to the representative gateway device 2.

Thereby, the gateway device 2 may suppress an increase in communication traffic between the gateway devices 2 while preferentially suppressing an increase in communication traffic between the information processing device 1 and each gateway device 2.

[Details of Processing of Searching for Measurement Data According to Search Request]

Next, details of processing of searching for the measurement data 231 according to search request will be described.

In this embodiment, the search key information 131 transmitted from the gateway device 2 to the information processing device 1 may include the search key information 131 transmitted from another gateway device 2 to the representative gateway device 2. Accordingly, the measurement data 231 corresponding to the search key information 131 transmitted from the gateway device 2 may include the measurement data 231 that is not stored in the gateway device 2 indicated by the gateway information 131c including the transmitted search key information 131.

Such measurement data 231 is stored in another gateway device 2 that transmits the search key information 131 to the gateway device 2 indicated by the gateway information 131c including the search key information 131 transmitted from the gateway device 2. Thus, when the measurement data 231 corresponding to the search request is not stored in the gateway device 2 indicated by the gateway information 131c included in the search key information 131 corresponding to the measurement data 231, the data search unit 115 of the information processing device 1 accesses the another gateway device 2.

Specifically, the data search unit 115 refers to the search key information 131 stored in the information storage area 230 of the gateway device 2 indicated by the gateway information 131c included in the search key information 131 corresponding to the measurement data 231 of a search target. The data search unit 115 identifies the gateway device 2 that transmits the measurement data 231 of the search target to the gateway device 2 indicated by the gateway information 131c. Then, the data search unit 115 refers to the information storage area 230 of the identified gateway device 2, and acquires the measurement data 231 of the search target.

Therefore, even when the measurement data 231 corresponding to the search request is not stored in the gateway device 2 indicated by the gateway information 131c included in the search key information 131, the data search unit 115 may search the measurement data 231 without largely increasing processing loads.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A gateway device that accesses to an information processing device configured to search for data based on search key information corresponding to data transmitted from a plurality of apparatuses, the gateway device comprising:
a memory; and
a processor coupled to the memory and configured to:
transmit first search key information to the information processing device, the first search key information corresponding to data received from at least one of the plurality of apparatuses;
determine whether second search key information has been sent to the information processing device, the second search key information corresponding to data received at an other gateway device from at least one of the plurality of apparatuses and the second search key information being integrated to the gateway device from the other gateway device in a case that the gateway device is determined as a representative gateway device by the information processing device; and
transmit the second search key information corresponding to a plurality of pieces of data received at the other gateway device, to the information processing device, when the second search key information has not been sent to the information processing device;
wherein the representative gateway device continues to receive the second search key information from the other gateway device based on a first ratio and a second ratio,
wherein the first ratio indicating current integration ratio information at the representative gateway device, is a number of pieces of the first and the second search key information transmitted to the information processing device from the representative gateway device, to a sum of a number of pieces of data received at the representative gateway device from the plurality of apparatuses and a number of pieces of the second search key information received from the other gateway device, and
wherein the second ratio indicating single integration ratio information is a number of pieces of third search key information transmitted to the information processing device from the other gateway device, to a number of pieces of data received from the plurality of apparatuses at the other gateway device, in a case that the other gateway device does not transmit the third search key information to the representative gateway device.

2. The gateway device according to claim 1,
wherein each of the first, the second and the third search key information includes identification information indicating the data transmitted from a particular apparatus of the plurality of apparatuses, and apparatus information indicating the particular apparatus,
wherein the apparatus information corresponding to at least one of the plurality of apparatuses includes integrated apparatus information, the integrated apparatus information indicating that two or more gateway devices transmit the first search key information or the third search key information corresponding to a certain apparatus of the plurality of the apparatuses to the information processing device,
wherein the representative gateway device is determined by the information processing device-from the two or more gateway devices based on a number of transmission of the first search key information or the third search key information corresponding to the certain apparatus from each of the two or more gateway devices.

3. The gateway device according to claim 2, wherein
the integrated apparatus information is transmitted from the information processing device to the other gateway device which is other than the representative gateway device among the two or more gateway devices.

4. The gateway device according to claim 2, wherein
the second search key information includes gateway information indicating the gateway device that transmits the second search key information to the information processing device, and
at receipt of a search request for the data, the information processing device identifies the second search key information including the identification information indicated by the data corresponding to the search request, and searches for the data corresponding to the search request from the data stored in a particular gateway device indicated by the gateway information included in the identified search key information.

5. The gateway device according to claim 4, wherein
when the data corresponding to the search request is not included in the data stored in the particular gateway device, the information processing device searches for the data corresponding to the search request from the data stored in the other gateway device that transmits the second search key information to the particular gateway device.

6. The gateway device according to claim 1, wherein
when a difference between the first ratio and the second ratio is less than a predetermined value, it is determined at the other gateway device, to continue transmission of the second search key information to the representative gateway device, and
when the difference between the first ratio and the second ratio is the predetermined value or more, it is determined at the other gateway device, to stop transmission of the search key information to the representative gateway device.

7. The gateway device according to claim 6, wherein
when it is determined to stop transmission of the second search key information to the representative gateway device and then, the difference between the first ratio and the second ratio is less than a predetermined value, it is determined to restart transmission of the second search key information to the representative gateway device.

8. A data correction method executed by a gateway device that accesses to an information processing device configured to search for data based on search key information corresponding to data transmitted from a plurality of apparatuses, the method comprising:
transmitting first search key information to the information processing device, the first search key information corresponding to data received from at least one of the plurality of apparatuses;
determining whether second search key information has been sent to the information processing device, the second search key information corresponding to data received at an other gateway device from at least one of the plurality of apparatuses and the second search key information being integrated to the gateway device from the other gateway device in a case that the gateway device is determined as a representative gateway device by the information processing device; and transmitting the second search key information corresponding to a plurality of pieces of data received at the other gateway device to the information processing device, when the second search key information has not been sent to the information processing device;

wherein the representative gateway device continues to receive the second search key information from the other gateway device based on a first ratio and a second ratio, wherein the first ratio indicating current integration ratio information at the representative gateway device, is a number of pieces of the first and the second search key information transmitted to the information processing device from the representative gateway device, to a sum of a number of pieces of data received at the representative gateway device from the plurality of apparatuses and a number of pieces of the second search key information received from the other gateway device, and wherein the second ratio indicating single integration ratio information is a number of pieces of third search key information transmitted to the information processing device from the other gateway device, to a number of pieces of data received from the plurality of apparatuses at the other gateway device, in a case that the other gateway device does not transmit the third search key information to the representative gateway device.

9. A data correction system comprising:

a plurality of gateway devices configured to store data transmitted from a plurality of apparatuses; and an information processing device configured to search for the data based on search key information corresponding to the data, wherein the information processing device includes:

a first memory; and a first processor coupled to the first memory and configured to:

receive search key information from at least one of the plurality of gateway devices, the search key information including identification indicating the data transmitted from a particular apparatus of the plurality of apparatuses, and apparatus information indicating the particular apparatus;

identify a particular apparatus information as integrated apparatus information, the particular apparatus information being included in two or more search key information from two or more gateway devices which transmit the search key information corresponding to the particular apparatus of the plurality of the apparatuses;

determine one of the two or more gateway devices as a representative gateway device, based on a number of transmission of the search key information corresponding to the particular apparatus, the representation gateway device transmitting the search key information corresponding to data transmitted from the particular apparatus, the data being received at other gateway devices of the two or more gateway devices;

and wherein each of the plurality of gateway devices includes:

a second memory; and a second processor coupled to the second memory and configured to:

transmit first search key information to the information processing device, the first search key information corresponding to data received from at least one of the plurality of apparatuses;

determine whether second search key information has been sent to the information processing device, the second search key information corresponding to data received at an other gateway device from at least one of the plurality of apparatuses and the second search key information being integrated to the gateway device from the other gateway device, in a case that the gateway device is determined as the representative gateway device by the information processing device; and transmit the second search key information corresponding to a plurality of pieces of data received at the other gateway device, to the information processing device, when the second search key information has not been sent to the information processing device, in the case that the gateway device is determined as the representative gateway device by the information processing device;

wherein the representative gateway device continues to receive the second search key information from the other gateway device based on a first ratio and a second ratio, wherein the first ratio indicating current integration ratio information at the representative gateway device, is a number of pieces of the first and the second search key information transmitted to the information processing device from the representative gateway device, to a sum of a number of pieces of data received at the representative gateway device from the plurality of apparatuses and a number of pieces of the second search key information received from the other gateway device, and wherein the second ratio indicating single integration ratio information is a number of pieces of third search key information transmitted to the information processing device from the other gateway device, to a number of pieces of data received from the plurality of apparatuses at the other gateway device, in a case that the other gateway device does not transmit the third search key information to the representative gateway device.

* * * * *